US010290059B2

United States Patent
Basu et al.

(10) Patent No.: US 10,290,059 B2
(45) Date of Patent: May 14, 2019

(54) DYNAMIC PORTFOLIO SIMULATOR TOOL APPARATUSES, METHODS AND SYSTEMS

(71) Applicant: FMR LLC, Boston, MA (US)

(72) Inventors: Archan Basu, Lexington, MA (US); Anshul Jain, Providence, RI (US)

(73) Assignee: FMR LLC, Boston, MA (US)

( * ) Notice: Subject to any disclaimer, the term of this patent is extended or adjusted under 35 U.S.C. 154(b) by 675 days.

(21) Appl. No.: 14/601,119

(22) Filed: Jan. 20, 2015

(65) Prior Publication Data
US 2015/0206245 A1   Jul. 23, 2015

Related U.S. Application Data

(60) Provisional application No. 61/929,478, filed on Jan. 20, 2014.

(51) Int. Cl.
| G06Q 40/06 | (2012.01) |
| G06F 3/0484 | (2013.01) |
| G06F 3/0482 | (2013.01) |

(52) U.S. Cl.
CPC .......... *G06Q 40/06* (2013.01); *G06F 3/0482* (2013.01); *G06F 3/0484* (2013.01)

(58) Field of Classification Search
CPC .................................................... G06Q 40/00
See application file for complete search history.

(56) References Cited

U.S. PATENT DOCUMENTS 5,499,325 A * 3/1996 Dugan, Jr. ............... G09G 1/07
345/589
5,918,217 A * 6/1999 Maggioncalda ... G06Q 30/0601
705/36 R (Continued)

FOREIGN PATENT DOCUMENTS

WO   2012162722   12/2012

OTHER PUBLICATIONS

Grzegorz Michalski, "Portfolio Management Approach in Trade Credit Decision Making", Roman Journal of Economic Forecasting, 2007, vol. 3, pp. 42-53, abstract and pp. 48-50.

(Continued)

*Primary Examiner* — William E Rankins
(74) *Attorney, Agent, or Firm* — Hanchuk Kheit LLP; Walter G. Hanchuk

(57) ABSTRACT

The Dynamic Portfolio Simulator Tool Apparatuses, Methods and Systems ("DPST") transforms market assumptions, constraints inputs via DPST components into asset allocation record, portfolio allocation and graphic presentation outputs. The DPST includes a dynamic portfolio simulator apparatus. The DPST includes a computing processor and memory, and the memory includes the following instructions. The DPST includes instructions to obtain a user indication of portfolio simulation request including user configured market assumption parameters and retrieve a user interface template comprising a portfolio parameter configuration widget. The DPST also includes instructions to calculate a parameter range for the portfolio parameter configuration widget based on the user configured market assumption parameters and customize the portfolio parameter configuration widget with the calculated parameter range. Then the DPST may provide the customized portfolio parameter configuration widget to a user device and obtain a user input of portfolio parameter via the customized portfolio parameter configuration widget. The DPST may also provide portfolio composite outputs based on the user input of portfolio parameter and provide the calculated portfolio composite outputs via the user interface.

9 Claims, 25 Drawing Sheets

(56) References Cited

U.S. PATENT DOCUMENTS

| | | | |
|---|---|---|---|
| 6,275,814 B1 | 8/2001 | Giansante et al. | |
| 7,050,998 B1 | 5/2006 | Kale et al. | |
| 8,429,051 B1* | 4/2013 | Samson | G06Q 40/06 235/379 |
| 9,400,976 B1* | 7/2016 | Courtright | G06Q 20/102 |
| 2001/0009003 A1* | 7/2001 | Groat | G06Q 20/108 705/36 R |
| 2005/0187851 A1* | 8/2005 | Sant | G06Q 40/06 705/36 R |
| 2006/0020531 A1* | 1/2006 | Veeneman | G06Q 40/00 705/35 |
| 2007/0005477 A1 | 1/2007 | McAtamney | |
| 2008/0208769 A1 | 8/2008 | Beer et al. | |
| 2009/0099978 A1 | 4/2009 | Manning | |
| 2012/0011458 A1 | 1/2012 | Xia | |
| 2012/0054121 A1 | 3/2012 | Fiala et al. | |
| 2012/0101933 A1 | 4/2012 | Hanson | |
| 2013/0174073 A1* | 7/2013 | Ash | G06F 3/048 715/771 |
| 2015/0134565 A1 | 5/2015 | Bendel | |
| 2016/0171608 A1* | 6/2016 | Milner | G06Q 40/06 705/36 R |

OTHER PUBLICATIONS

International Search Report and Written Opinion for application No. PCT/US2014/071765, dated Apr. 27, 2015.

* cited by examiner

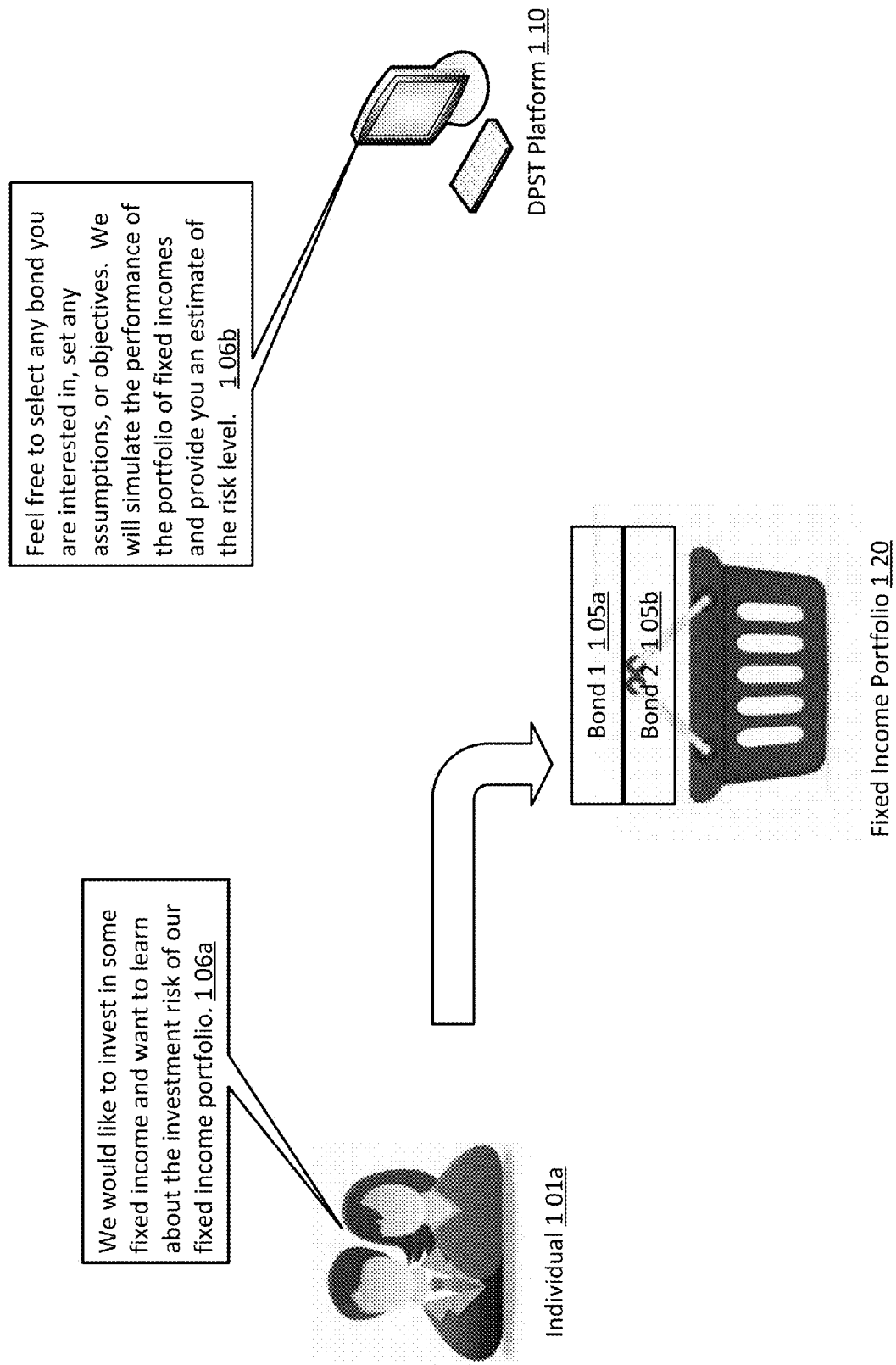
Fig.1: DPST—Fixed Income Portfolio Simulation

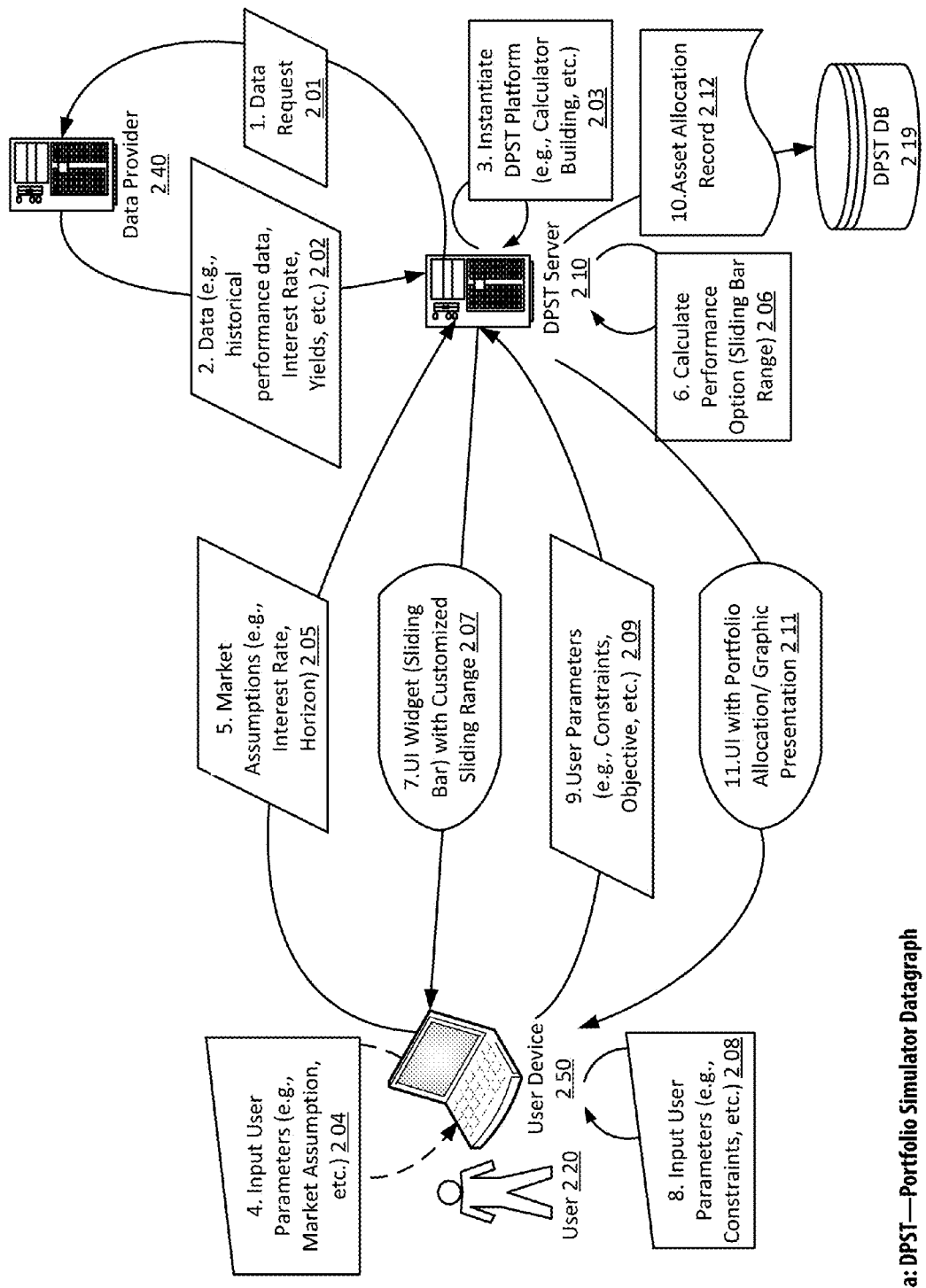
Fig.2a: DPST—Portfolio Simulator Datagraph

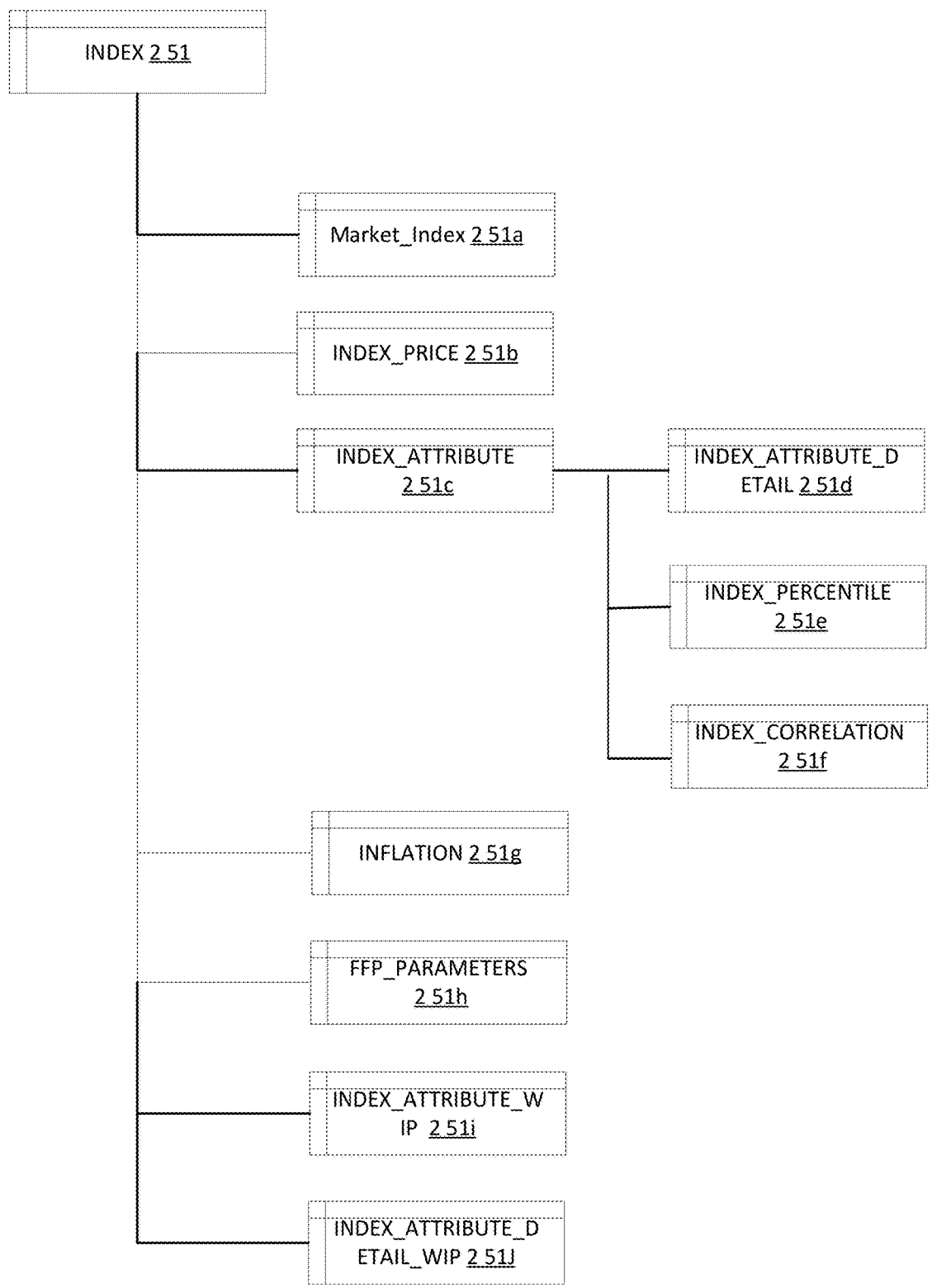
Fig.2b: DPST—Data Structure

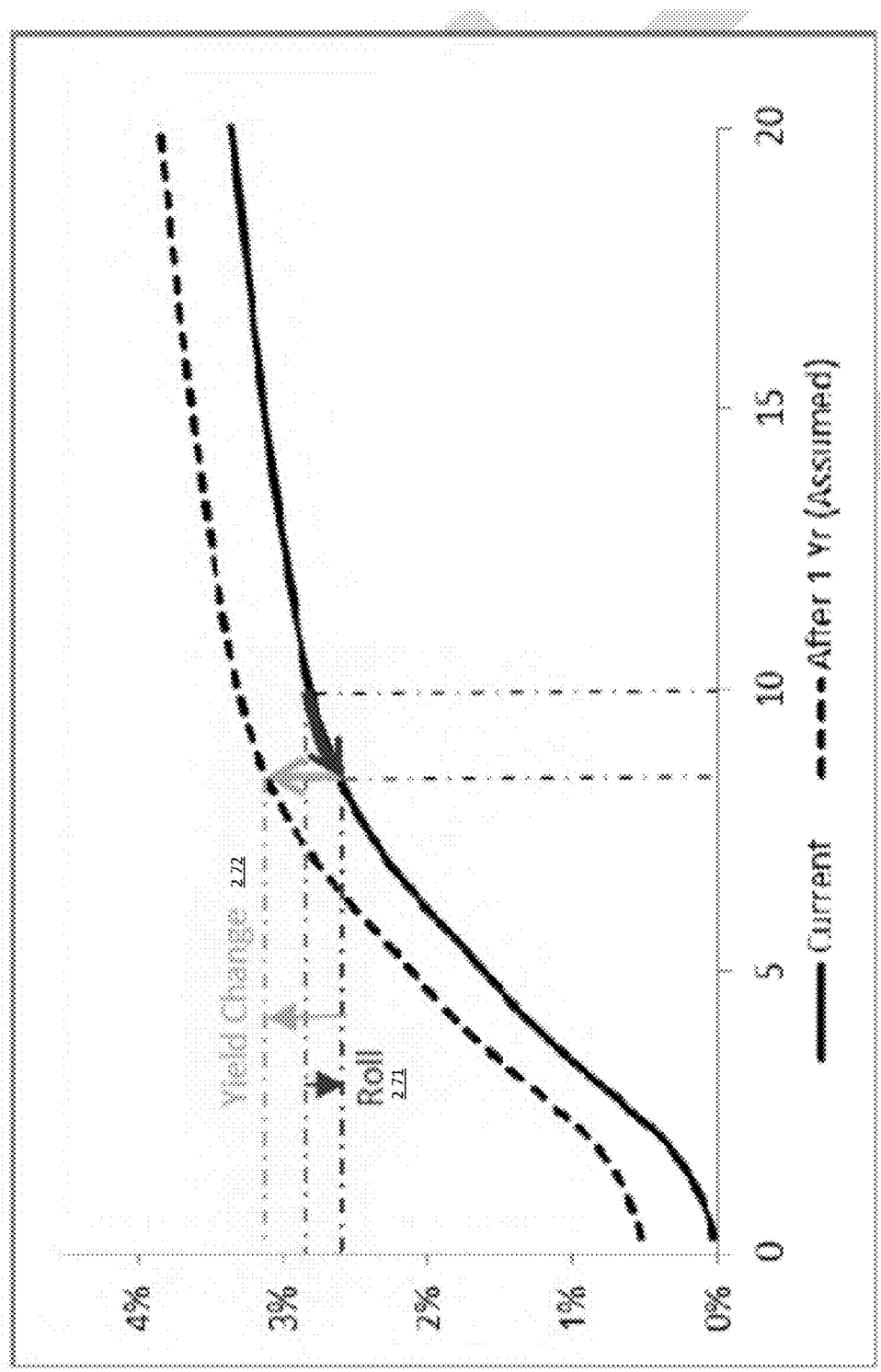
Fig.2c: DPST—Yield Processing Data Plot

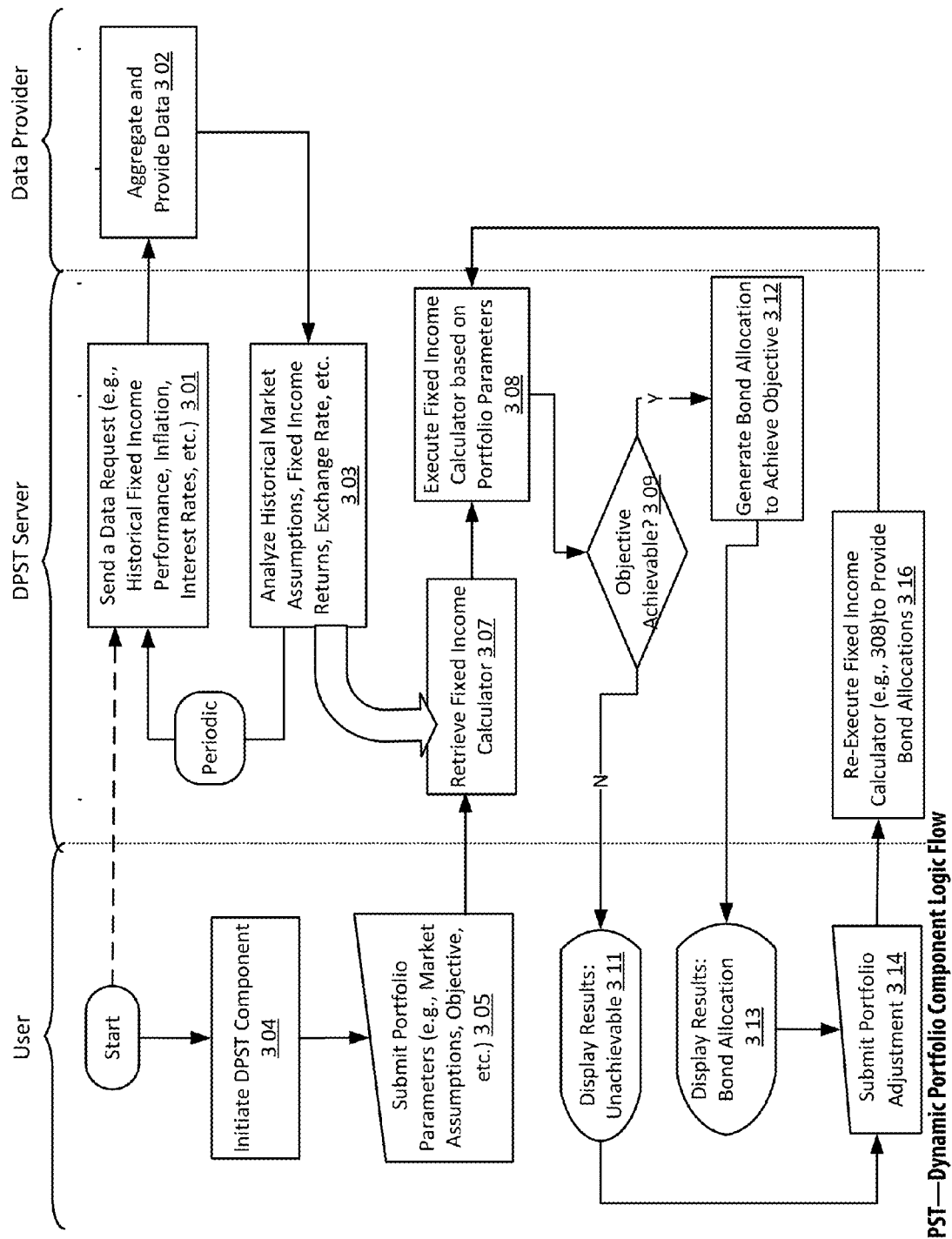
Fig.3a: DPST—Dynamic Portfolio Component Logic Flow

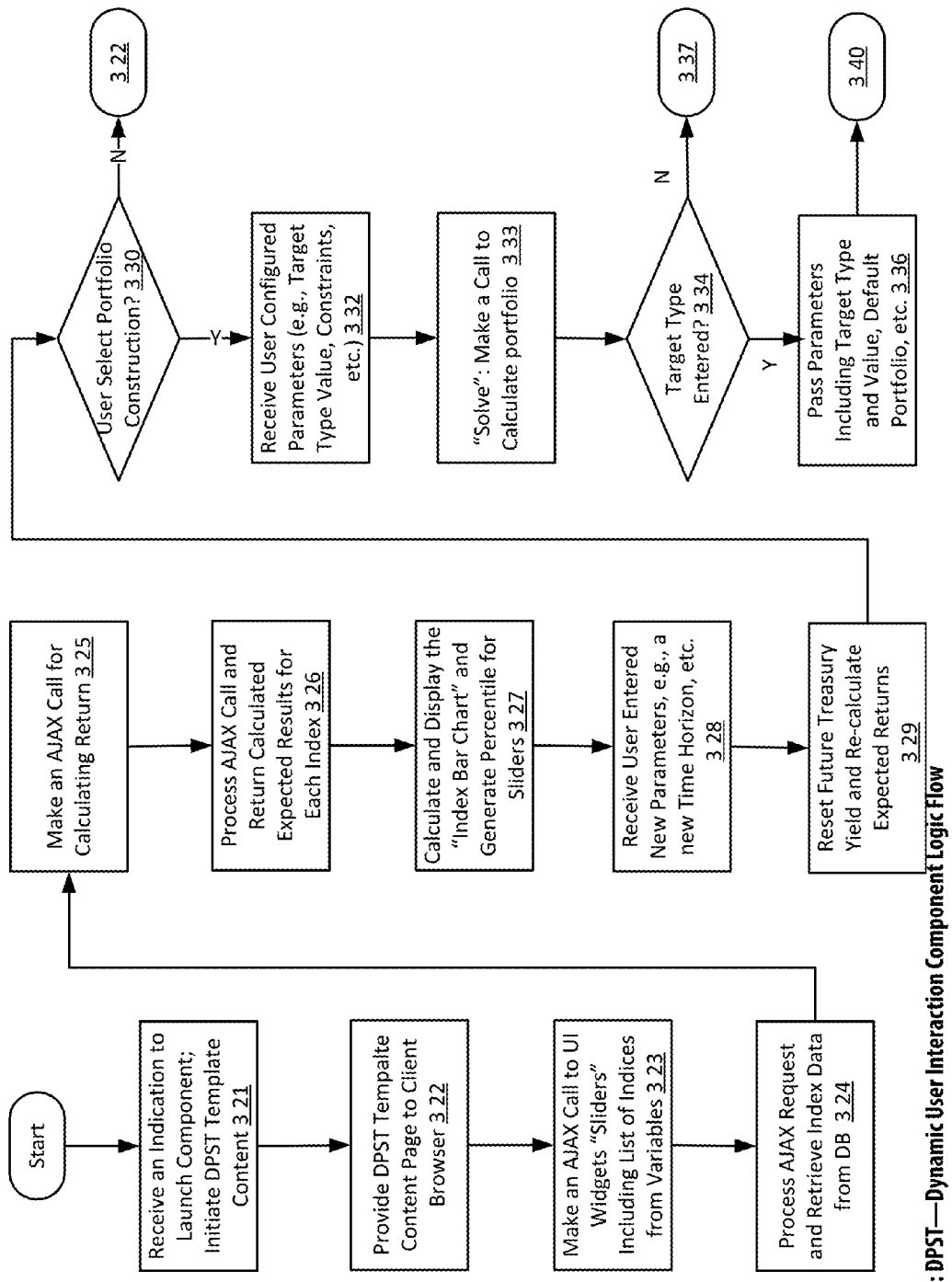
Fig.3b: DPST—Dynamic User Interaction Component Logic Flow

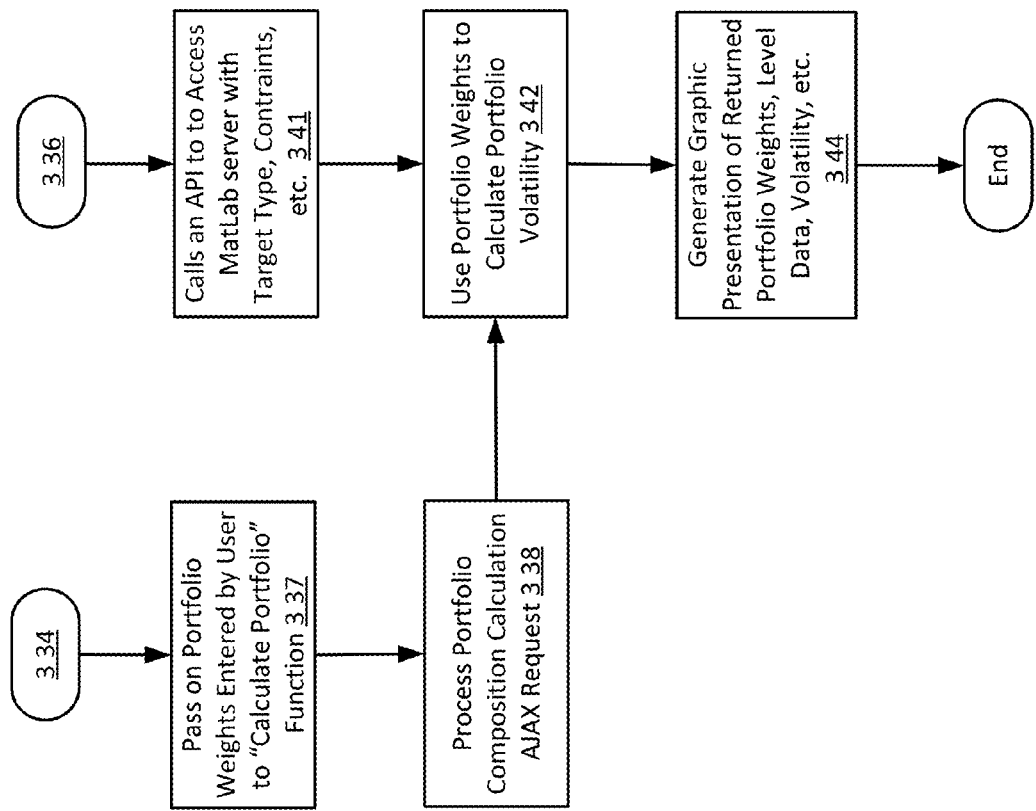
Fig.3c: DPST—Dynamic User Interaction Component Logic Flow

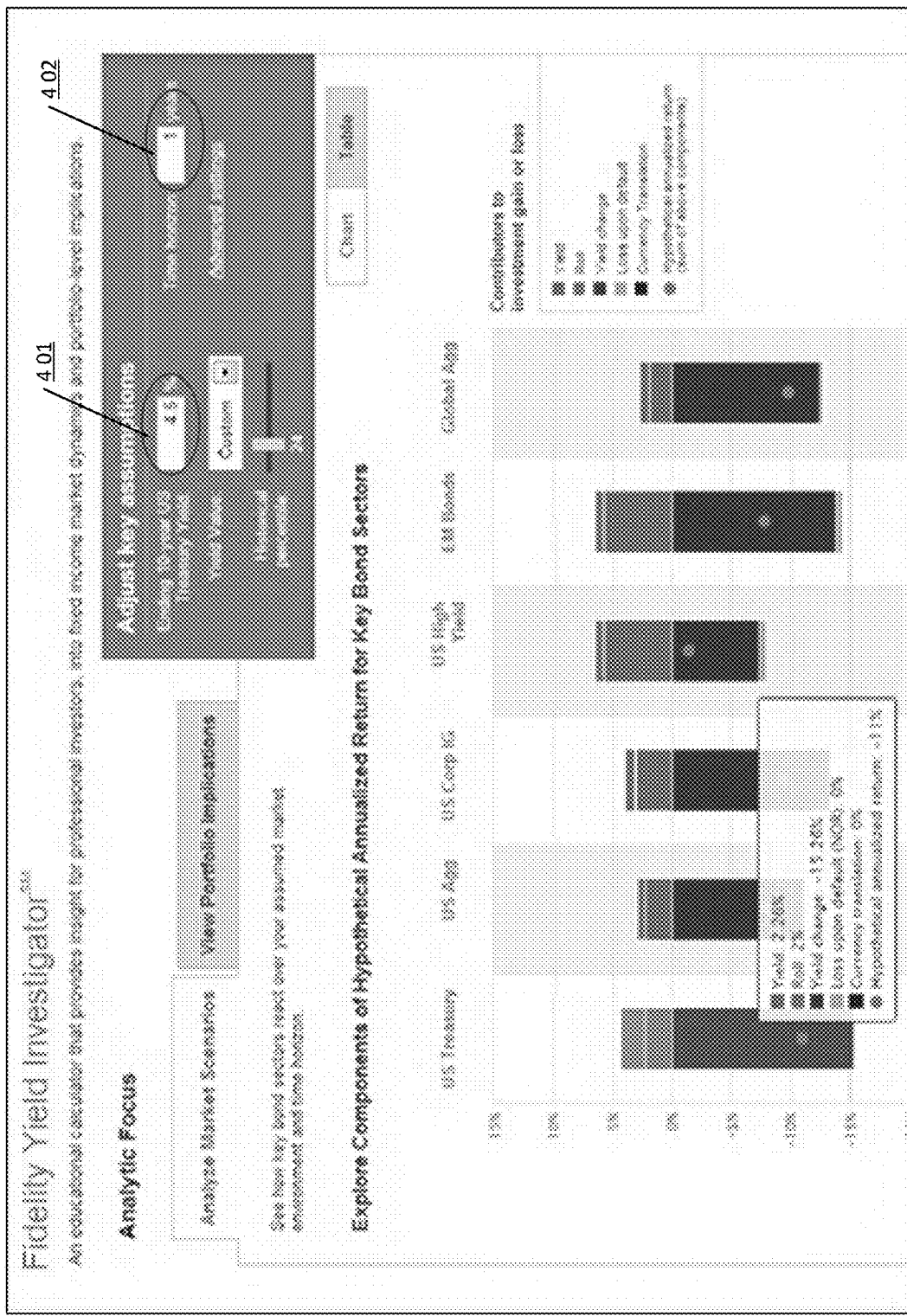
Fig.4a: DPST—User Interface

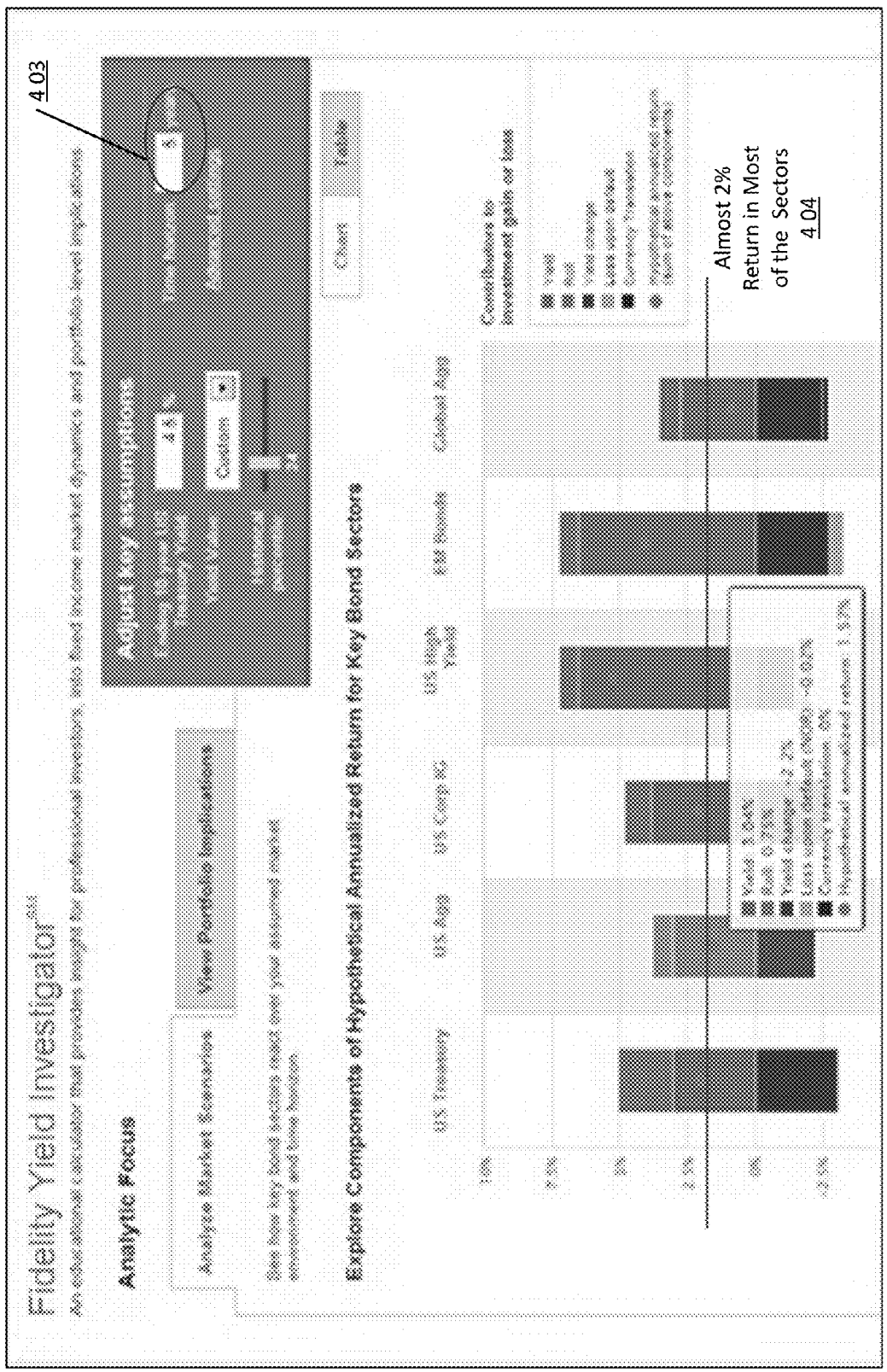
Fig.4b: DPST—User Interface

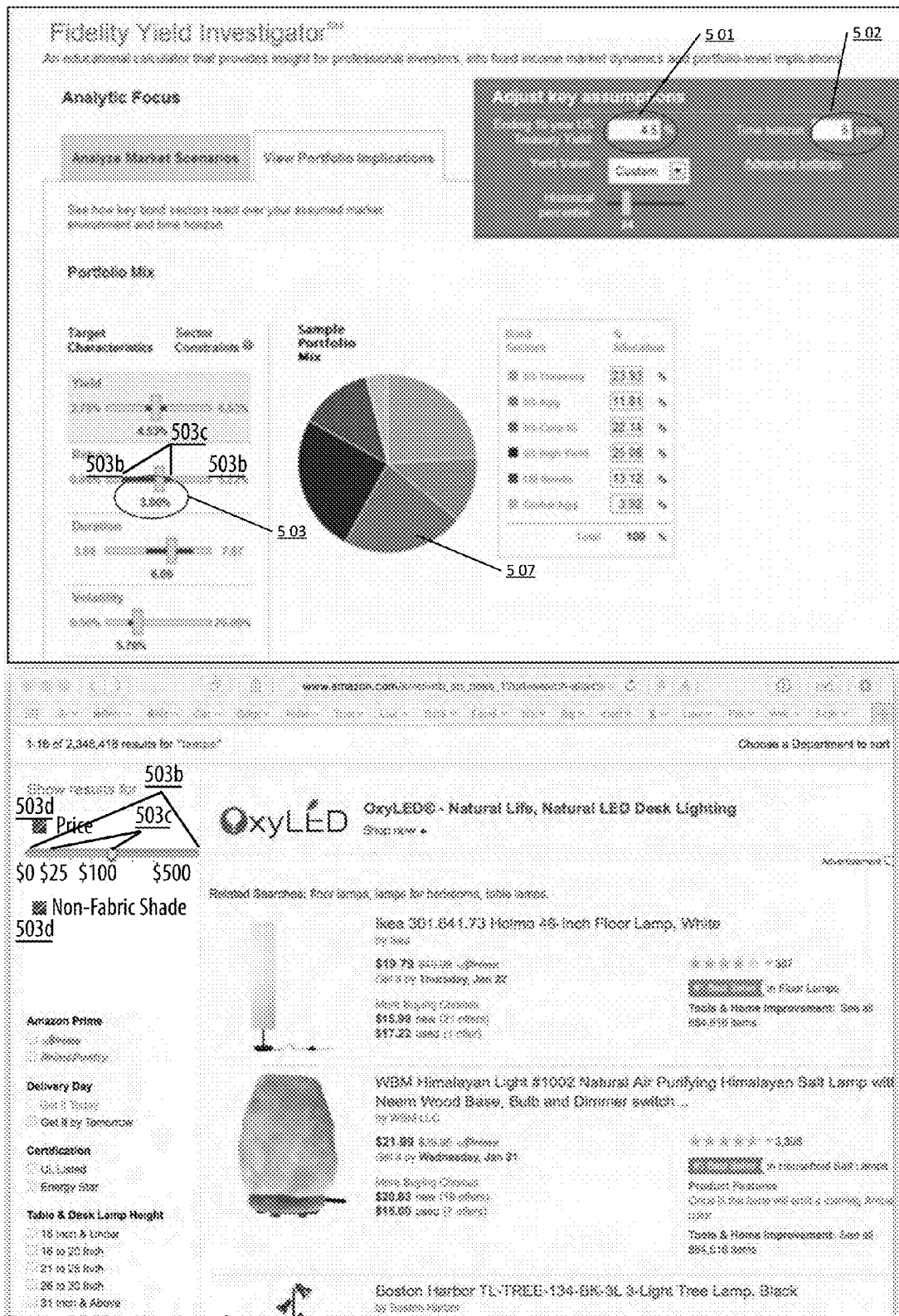
Fig.5a: DPST—User Interface 1

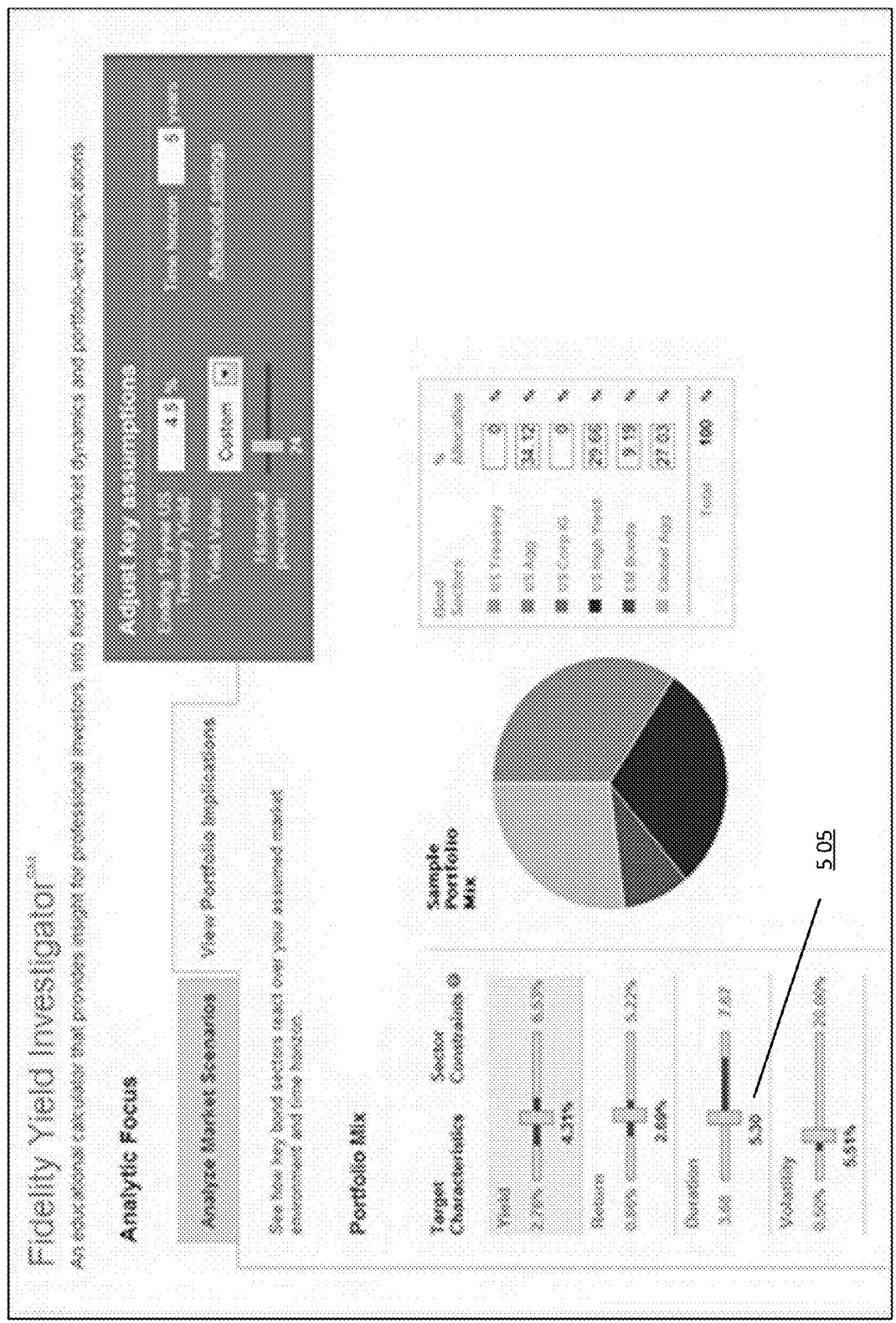
Fig.5b: DPST—User Interface

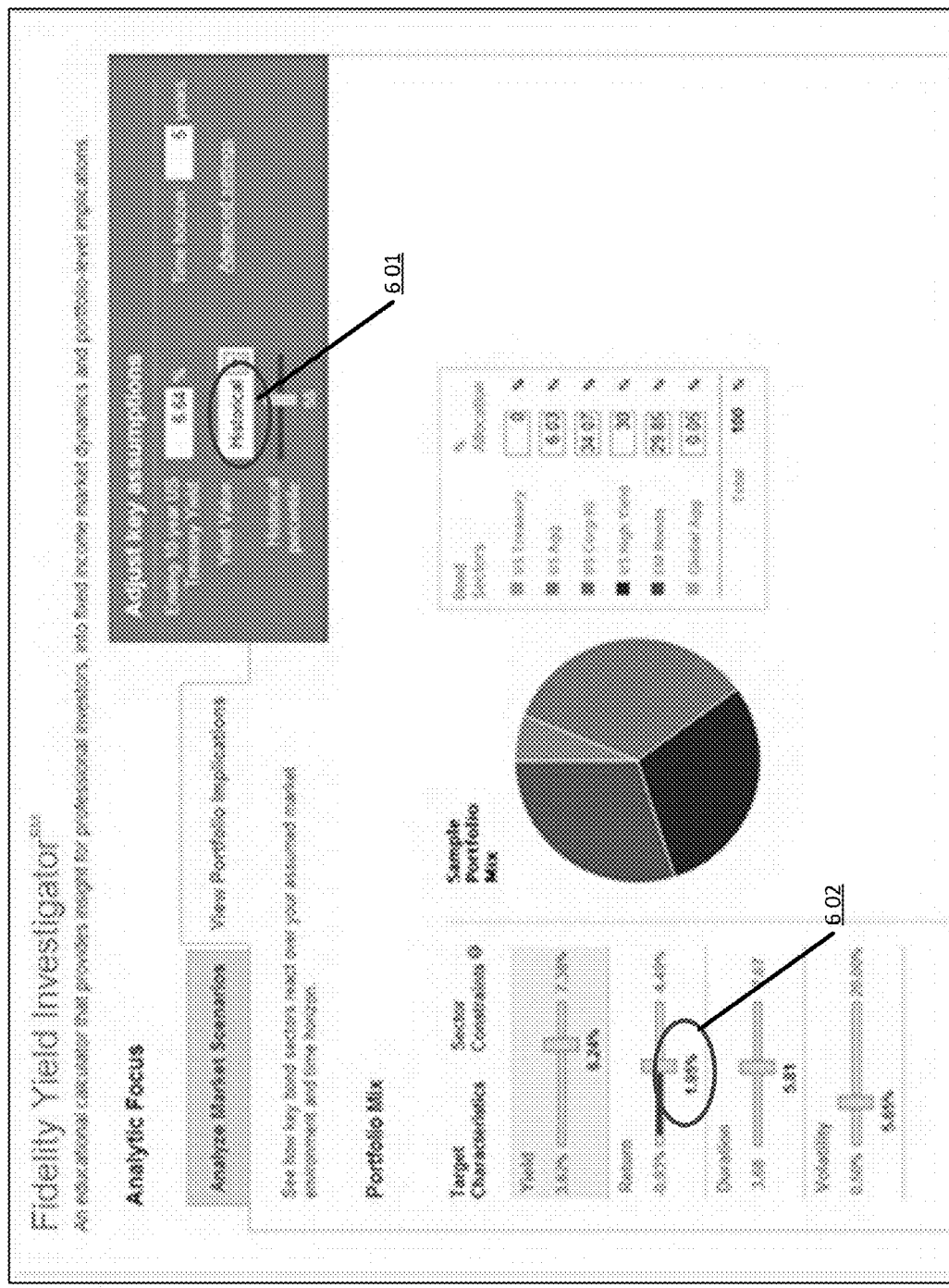
Fig.6a: DPSI—User Interface

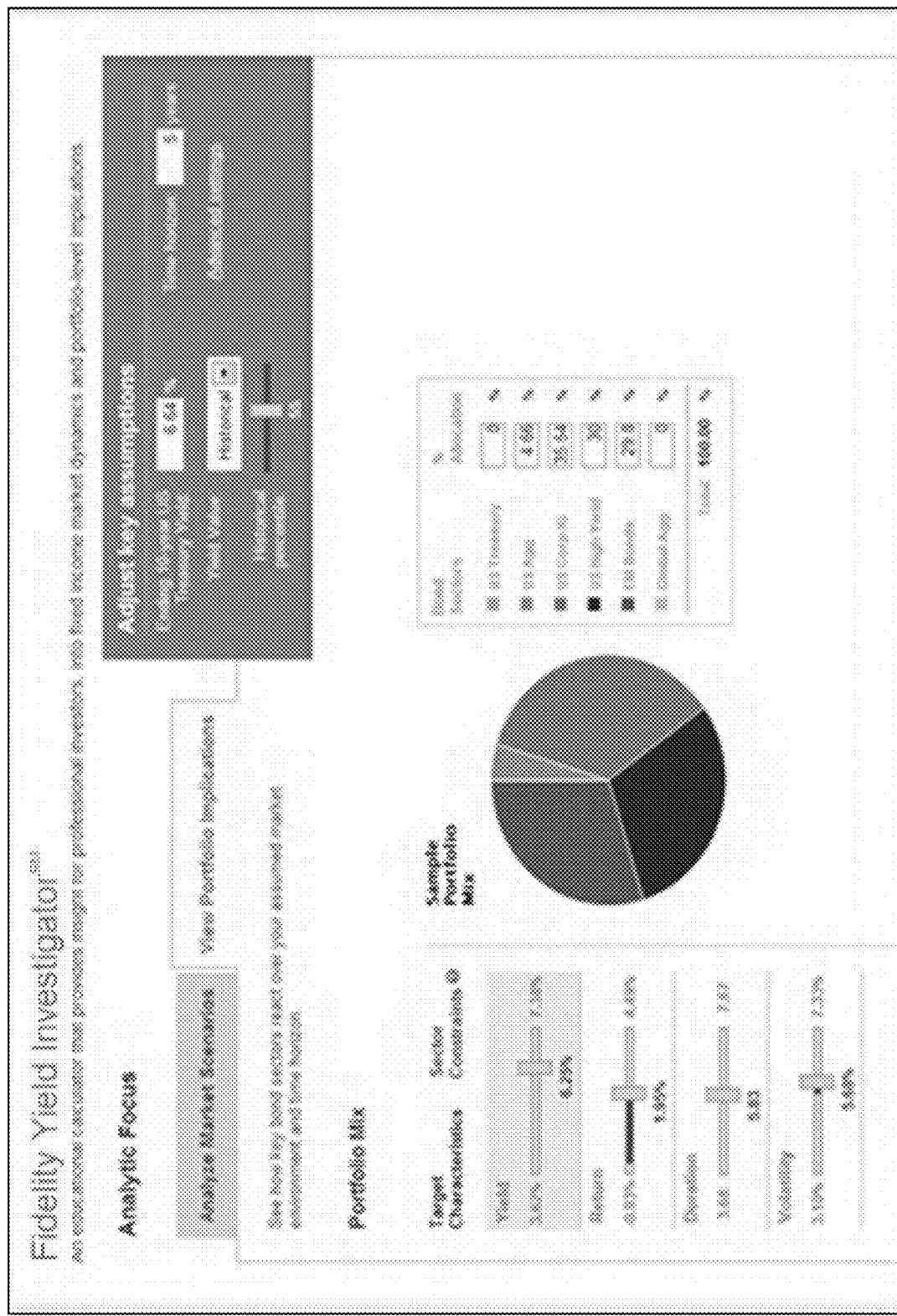
Fig.6b: DPST—User Interface

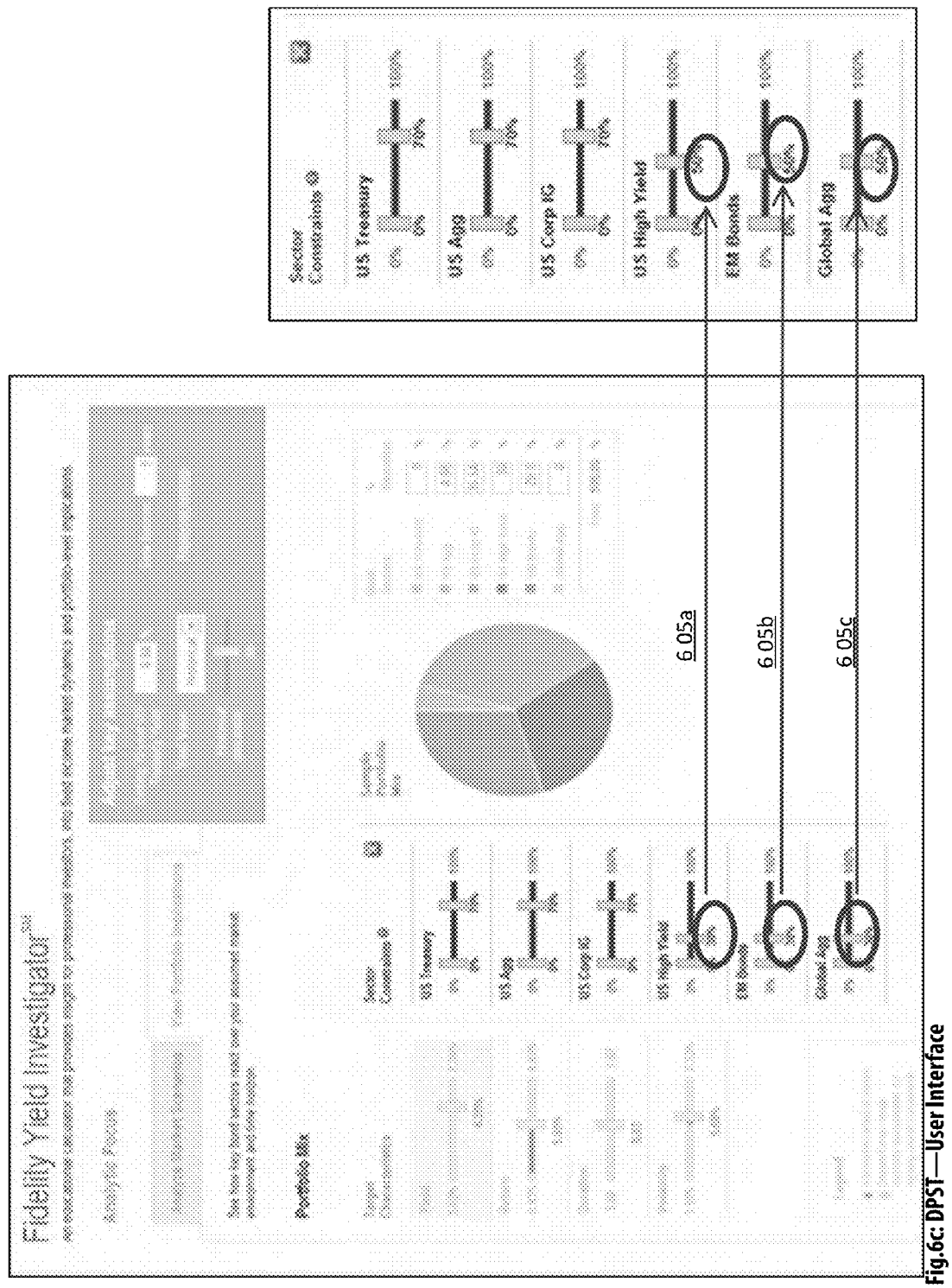
Fig.6c: DPST—User Interface

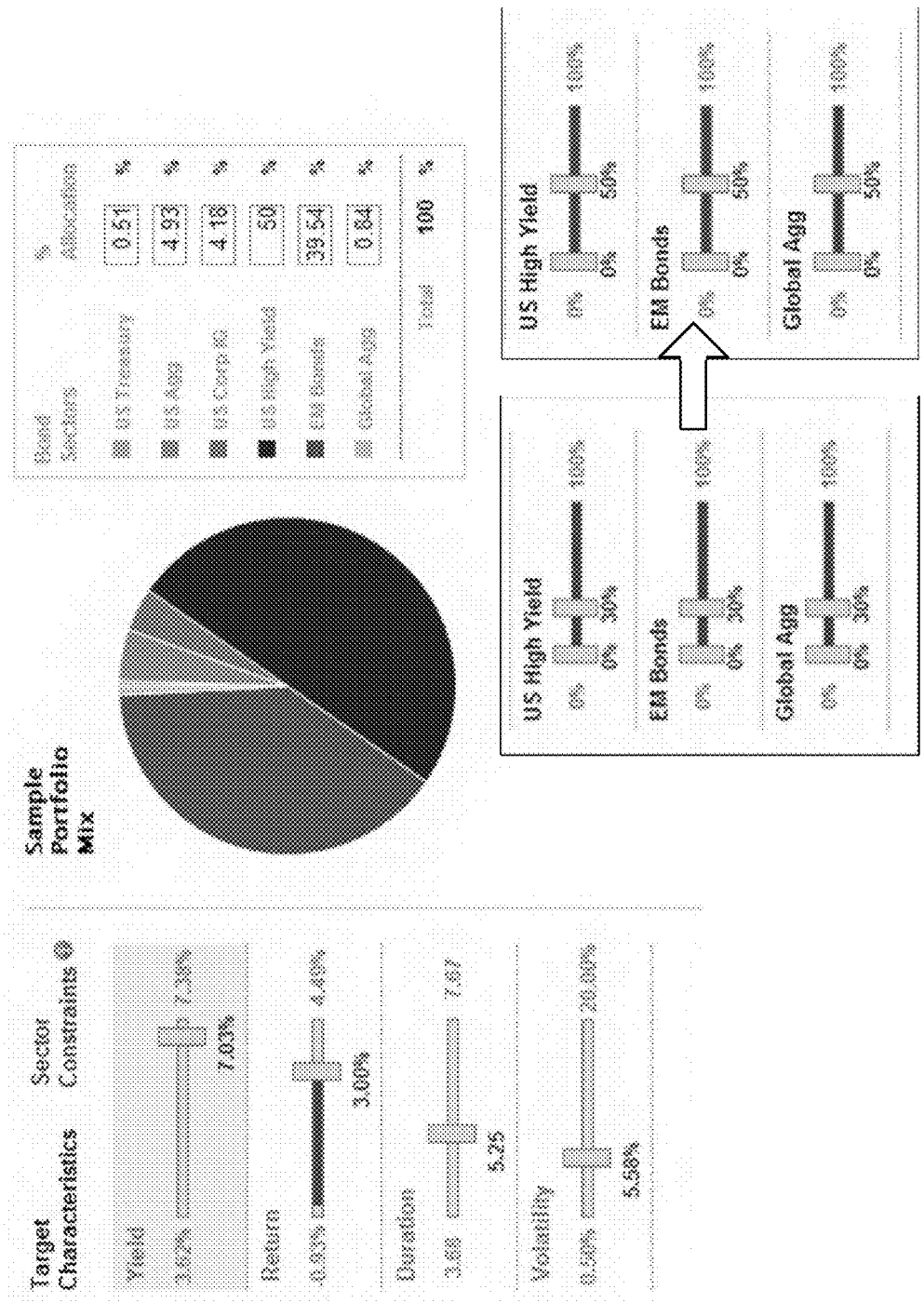
Fig.6d: DPST—User Interface

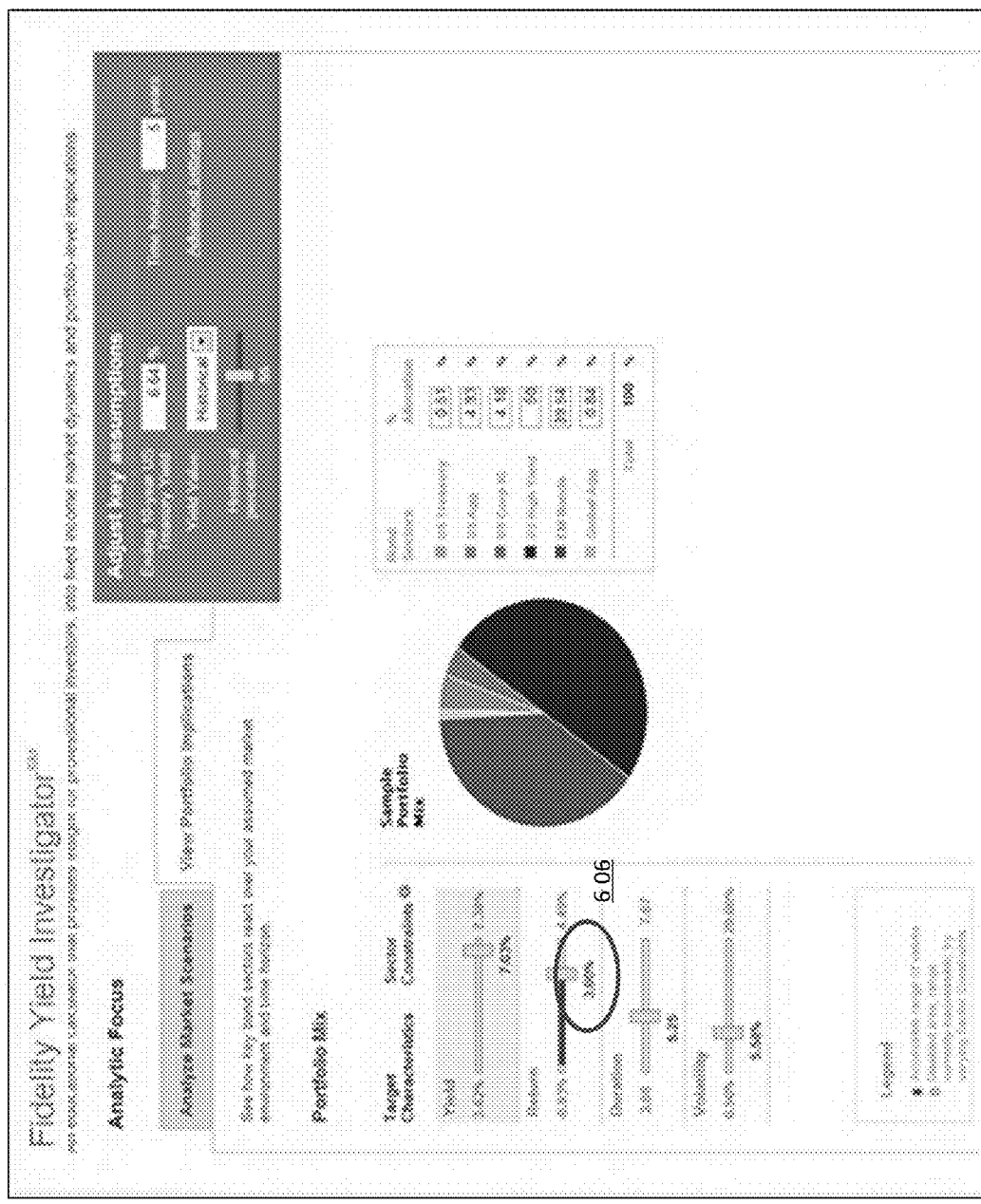
Fig.6e: DPST—User Interface

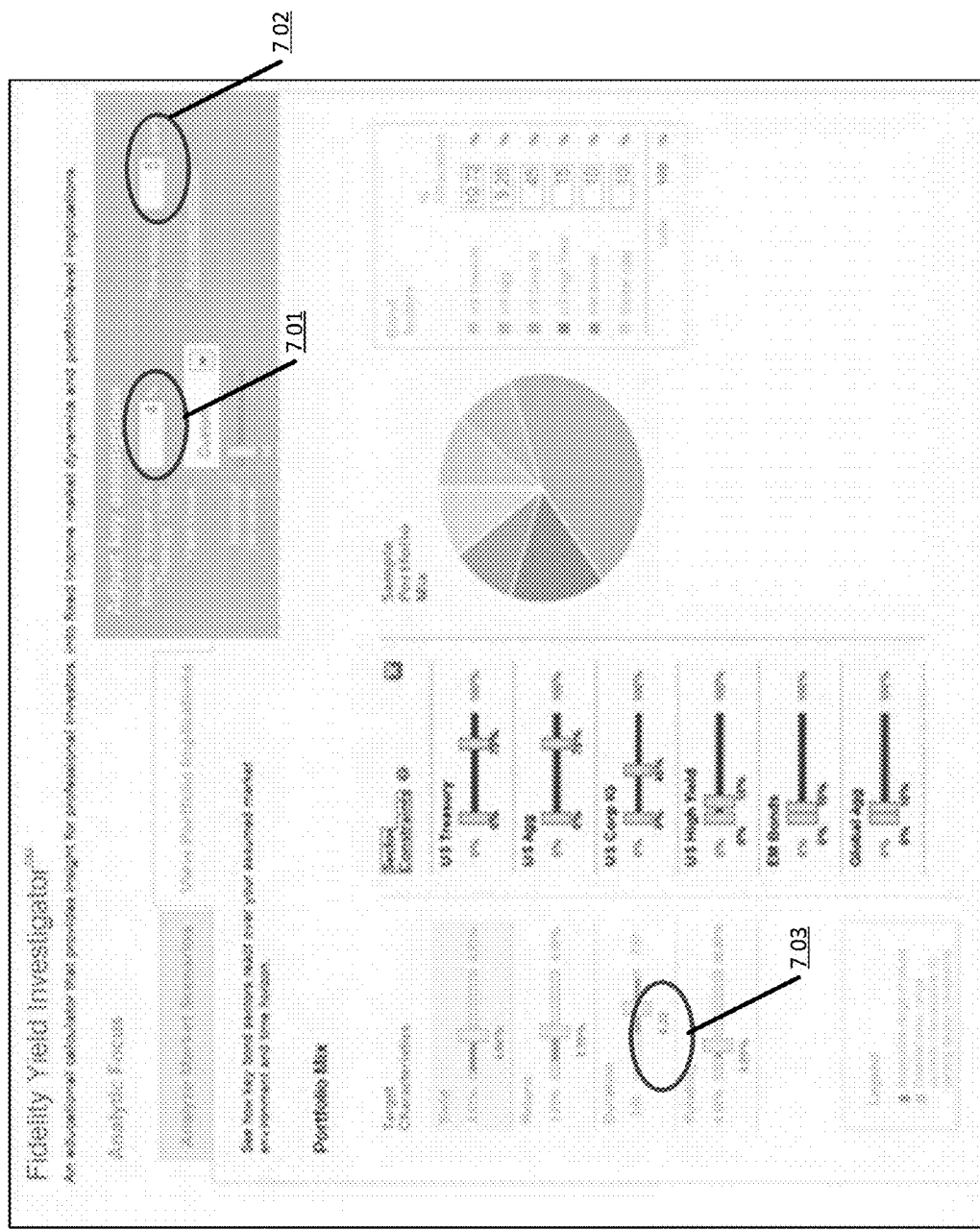
Fig. 7a: DPST—User Interface

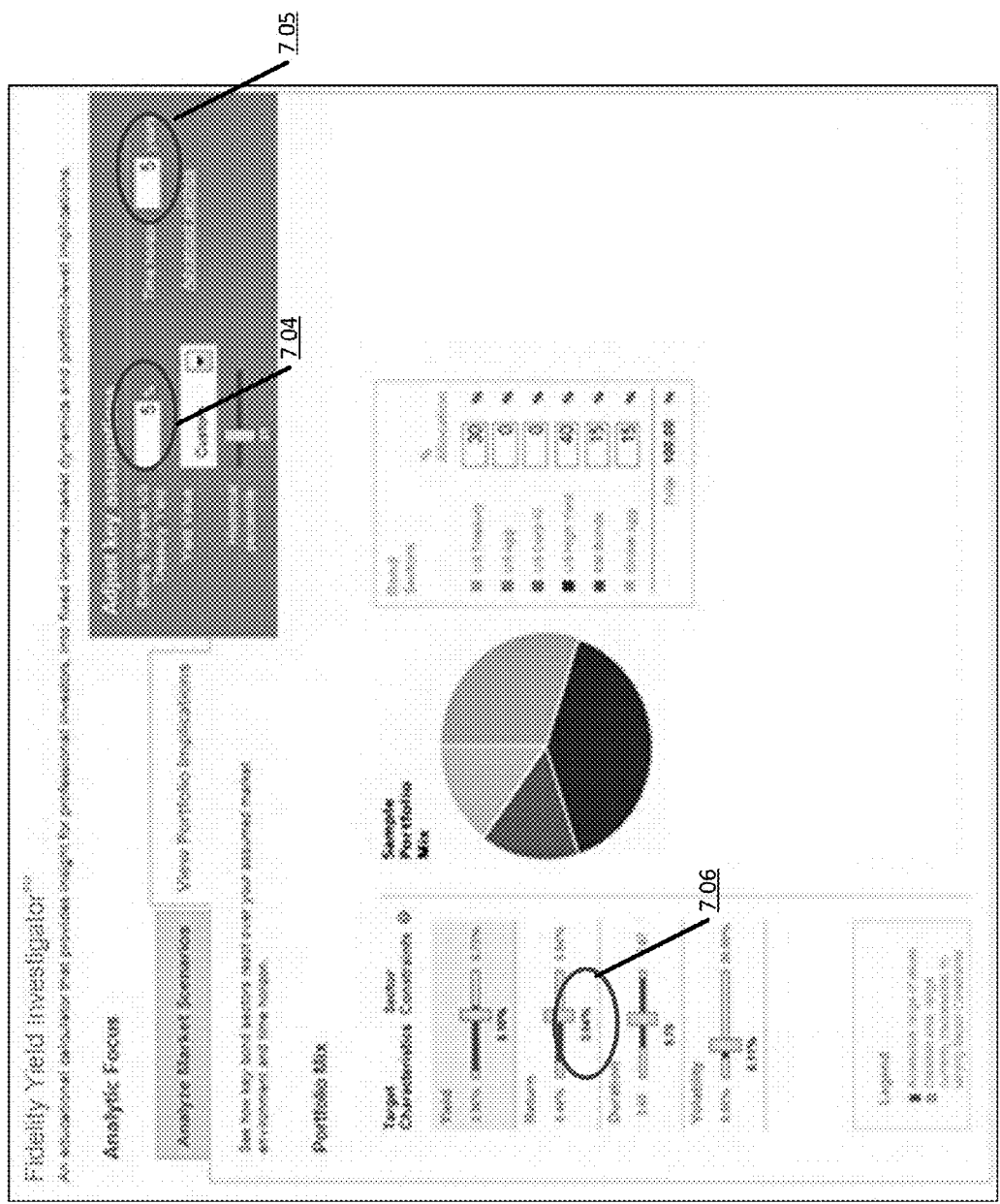
Fig.7b: DPST—User Interface

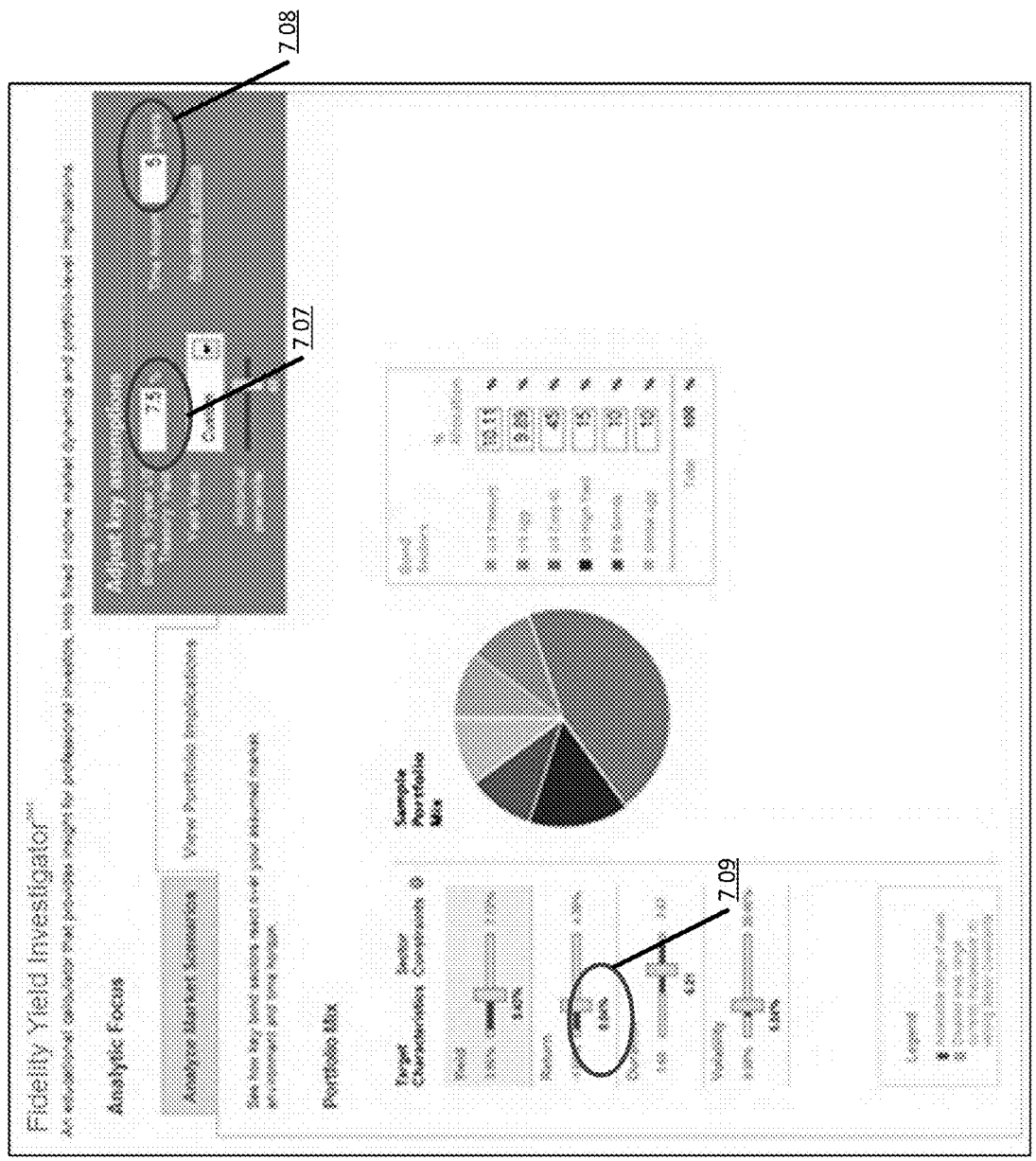
Fig. 7c: DPST—User Interface

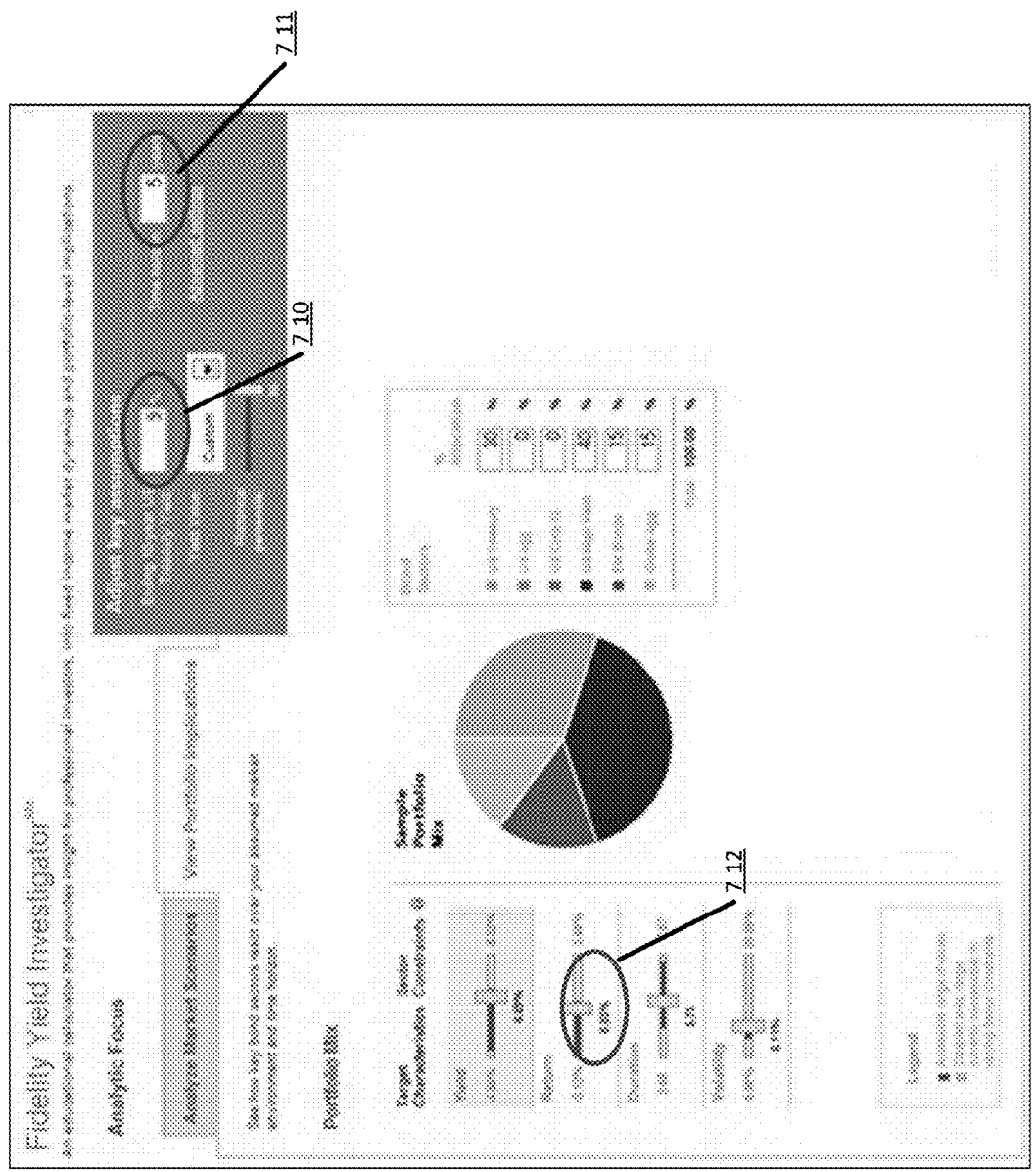
Fig.7d: DPST—User Interface

Fig.8a: DPST—User Interface

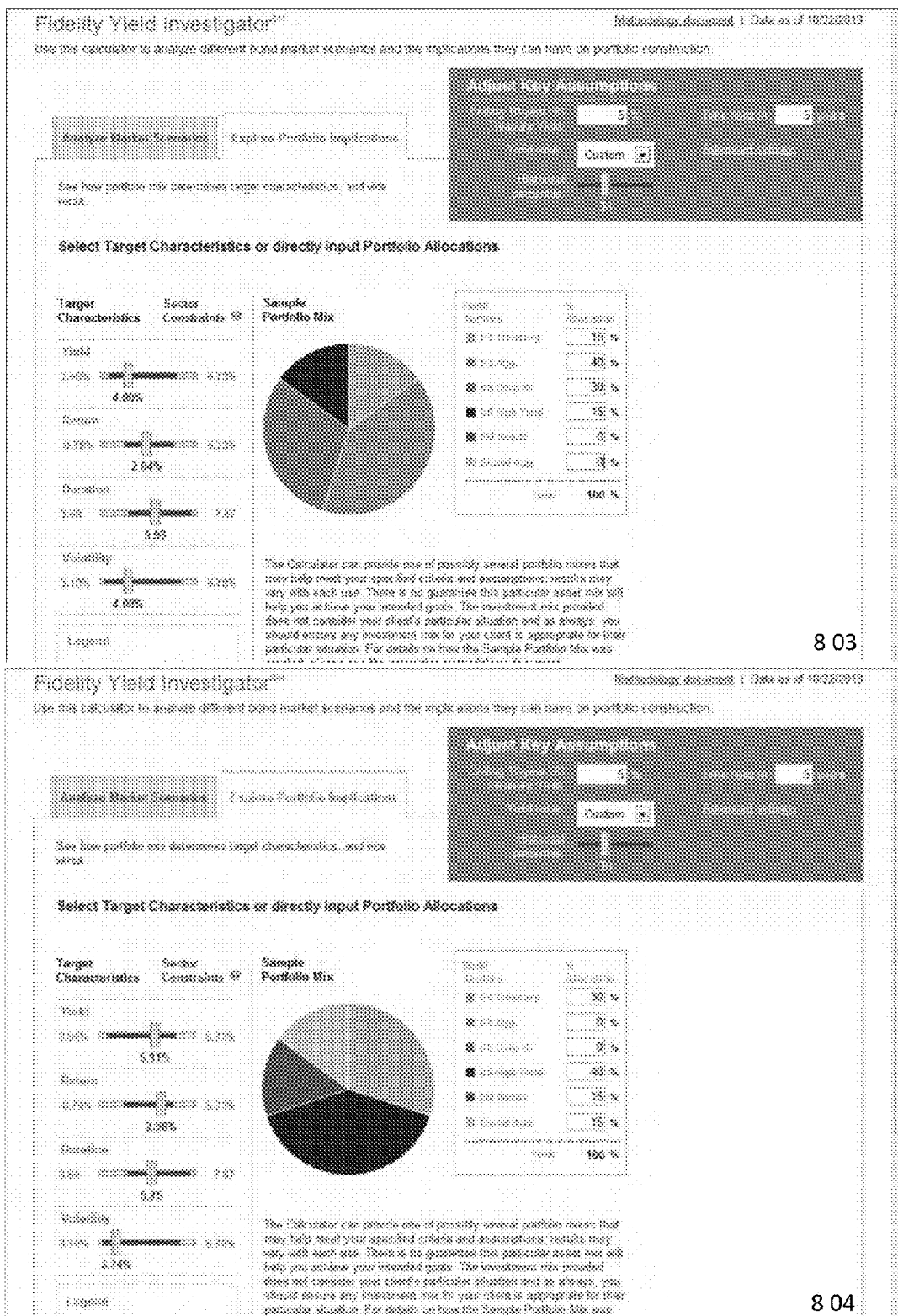
Fig.8b: DPST—User Interface 2

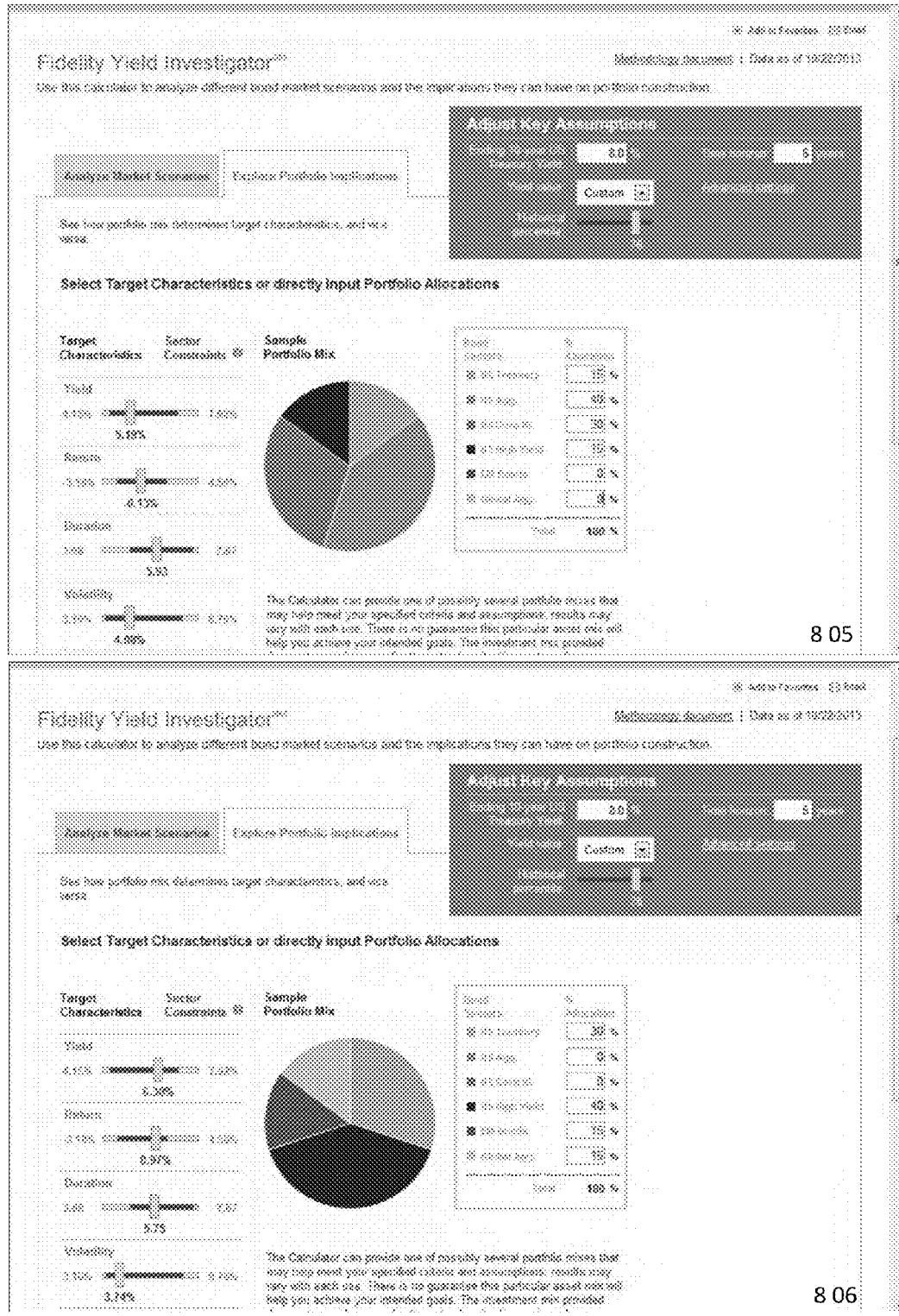
Fig.8c: DPST—User Interface

Fig.8d: DPST—User Interface

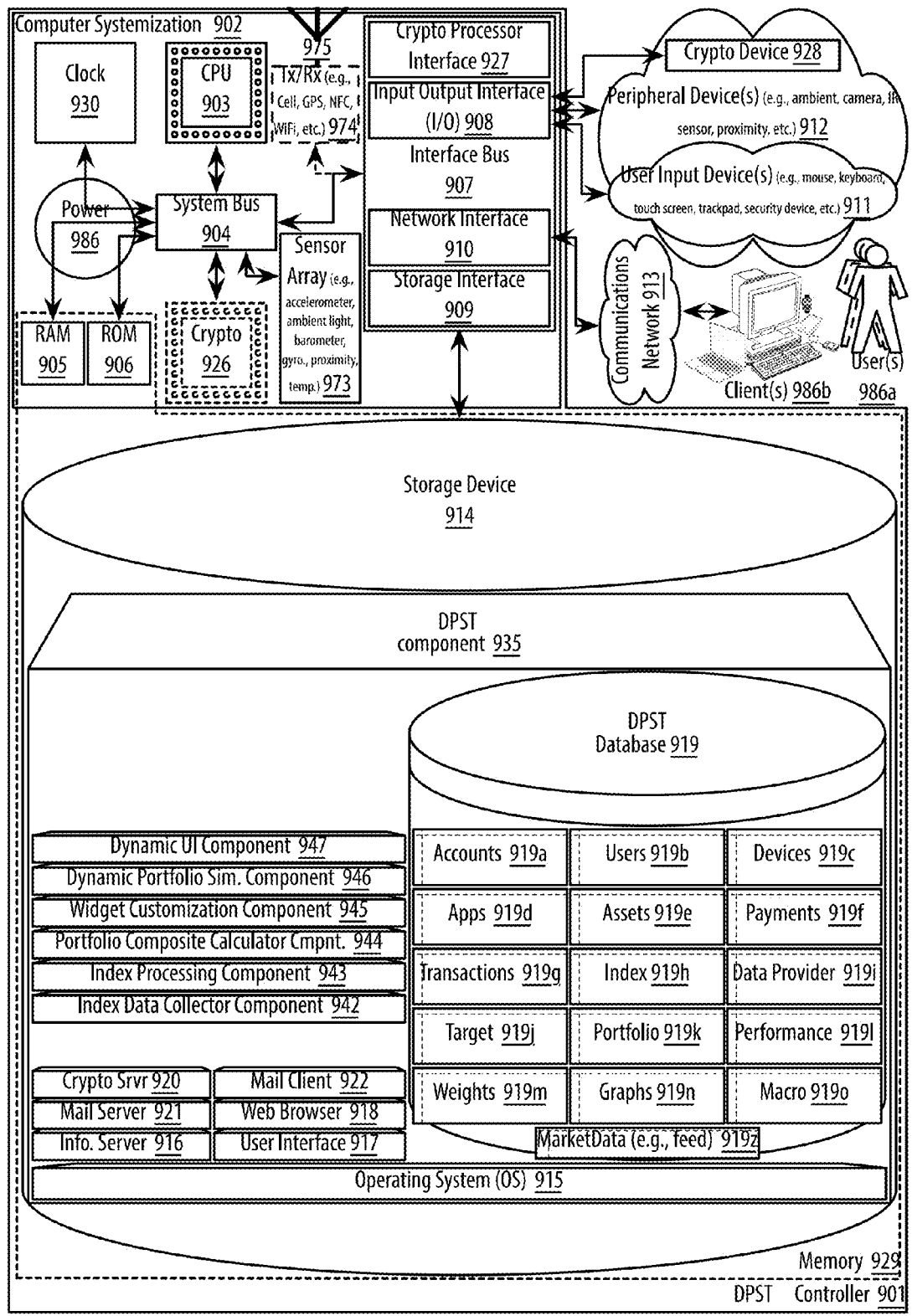
Fig.9: DPST—Controller

DYNAMIC PORTFOLIO SIMULATOR TOOL APPARATUSES, METHODS AND SYSTEMS

PRIORITY CLAIM

Applicant hereby claims benefit to priority under 35 USC § 119 as a non-provisional conversion of: U.S. provisional patent application Ser. No. 61/929,478, filed Jan. 20, 2014, entitled "DYNAMIC PORTFOLIO SIMULATOR TOOL APPARATUSES, METHODS AND SYSTEMS".

The entire contents of the aforementioned applications are herein expressly incorporated by reference.

FIELD

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

The present innovations generally address asset information technology, and more particularly, include Dynamic Portfolio Simulator Tool Apparatuses, Methods and Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Computer systems allow investors and managers to trade equities. Funds in the retirement saving accounts are managed by an investment manager for the individual investor to invest in various financial vehicles, such as a pension fund.

BRIEF DESCRIPTION OF THE DRAWINGS

Appendices and/or drawings illustrating various, non-limiting, example, innovative aspects of the Dynamic Portfolio Simulator Tool Apparatuses, Methods and Systems (hereinafter "DPST") disclosure, include:

FIG. 1 provides an example diagram illustrating aspects of fixed income portfolio simulation within embodiments of the DPST;

FIG. 2A provides an example datagraph diagram illustrating aspects of interactive data flows between the DPST server and its affiliated entities for portfolio simulation within embodiments of the DPST;

FIG. 2B provides an example block diagram illustrating aspects of index data structure within embodiments of the DPST;

FIG. 2C provides an exemplary data plot illustrating yield processing within embodiments of the DPST;

FIG. 3A provide a logic flow diagram illustrating interactive process flows between a user/participant and the DPST server for portfolio simulation within embodiments of the DPST;

FIGS. 3B-3C provides an exemplary logic flow illustrating dynamic user interactions for portfolio calculation within embodiments of the DPST;

FIGS. 4A-8D provide example user interface (UI) diagrams illustrating aspects of portfolio configuration and calculation within embodiments of the DPST;

FIG. 9 shows a block diagram illustrating embodiments of a DPST controller;

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citation and/or reference numbers are not necessarily sequences but rather just example orders that may be rearranged and other orders are contemplated.

DETAILED DESCRIPTION

The Dynamic Portfolio Simulator Tool Apparatuses, Methods and Systems (hereinafter "DPST") transforms market assumptions, constraints inputs, via DPST components (e.g., index data collector, index processing, portfolio composite calculator, widget customization, dynamic porftolio simulation, dynamic user interface, etc.), into asset allocation record, portfolio allocation and graphic presentation outputs. In one embodiment, the DPST provides a dynamic calculation tool for investors to interactively simulate and obtain the performance (e.g., return, risk level, etc.) of a user constructed fixed income portfolio, and adjust parameters of the portfolio The DPST components, in various embodiments, implement advantageous features as set forth below.

Introduction

In one embodiment, the DPST may serve as an educational calculator that can equip users with a clearer grasp over the many interrelationships underlying fixed income assets and allow users to derive portfolio-level implications from their bond market views. The DPST tool may analyze a user's bond market views (more specifically treasury yield increase/decrease for a given time horizon) and guide the user on its implication on different fixed income asset classes. In one implementation, the DPST tool may enhance the user's understanding of bond mechanics concepts and help him in the investment decision-making process. The DPST tool may follow a building block approach to help the user translate his bond market views into return implications over a broader asset class level. The DPST tool may also build 'what if' scenarios and demonstrate portfolio construction based on the user's portfolio level objectives.

For example, a user may configure parameters in the DPST tools to set assumptions such as, e.g., US Treasury yields to be near the low end of their historical range, and to obtain estimates of the credit spreads. For another example, the DPST may analyze trends of fixed income asset classes when US Treasury rates rise or fall. In further examples, the DPST may analyze how US Treasury yields rising quickly (in 1 year) or slowly (over 15 years) may affect a fixed income instrument, how different rate and time horizon scenarios may affect certain return contributions to fixed income securities such as yield, roll, yield surprise, risk of default, and currency adjustments, and/or the like.

In further examples, the DPST may analyze when building a fixed income portfolio to a specified yield target, the different performance and/or portfolio construction strategy for the user when the user targets at any characteristic value, such as maximizing returns, minimizing volatility, minimizing duration, and/or the like.

Within implementations, the DPST may provide a client calculator component that brings together in one place all five drivers of fixed income, e.g., total return (yield), roll, yield change, defaults (net of recovery) and exchange rate effects. The DPST client component may provide a portfolio optimizer interface consisting of dynamic slider bars, where the allowable range on each slider is calculated on the fly based on holdings constraints and other user input (e.g., see FIGS. 4A-7D, etc.).

In some embodiments, the DPST may provide dynamic sliders, for example, in a portfolio construction tab. The DPST may, in some implementations, follow a batching process where a user may enter a set of input parameters—such as yield, return, duration, volatility, and correlation—and hit a "Solve" button. The DPST may optimize a set of solutions and may provide a portfolio mix which meets a user's objectives and constraints. While in some embodiments a user may hit a "Solve" button to view results after each alteration, other embodiments may automatically update and refresh as the user makes changes. The DPST may make optimization more transparent and thereby may enable the user to view portfolio tradeoffs in a clear and concise manner. Users may view inputs and outputs side-by-side and explore how a change in each parameter affects the other parameters.

FIG. 1 provides an example diagram illustrating aspects of DPST simulator for fixed income portfolio within embodiments of the DPST. In one implementation, the DPST 110 may provide a client component to help investment professionals (e.g., user 101a) to compute the effect of certain economic and mathematical relationships within the fixed income market and how various bond sectors may react to changes in yield and spread levels over various investment horizons for the user's fixed income portfolio 120 (e.g., with various bond selections 105a-b), e.g., 106a. In one implementation, the DPST 110 may allow the user to play out certain hypothetical scenarios and their possible effect on certain fixed income investments as represented by market indices, e.g., by configuring different interest rate assumptions, investment objective, and/or the like, 106b.

FIG. 2 provides an example datagraph diagram illustrating aspects of interactive data flows between the DPST server and its affiliated entities for DIA-purchasing and management within embodiments of the DPST. Within embodiments, a DPST server 220, a user 220 (e.g., an individual investor, a portfolio manager, a broker, etc.), a user device 250, a data provider 240 (e.g., (e.g., Bloomberg, NYSE, Chicago Board of Exchange, and/or other financial exchange, data service providers, and/or the like), a DPST database 219, and/or the like, may interact and exchange data messages via a communication network with regard to fixed income portfolio dynamic simulating within embodiments of the DPST.

In one embodiment, the DPST server 210 may constantly, intermittently, periodically, and/or on an on-demand basis, requesting data from a data provider 240. Such data provider 240 may provide historical market data (e.g., index, etc.), investment performance data, interest rate, treasury yields, and/or the like. Such data may be integrated and stored in the DPST database 219, e.g., in the INDEX table 251 and its sub-tables 251a-f in FIG. 2B.

In one implementation, the DPST server 210 may send a data request 201 to the Data provider 240, and obtain the data listing 202 (e.g., market index, corporate/treasury yields, etc.). For example, in one implementation, the returned data 202 may include a variety of different data formats, including, but not limited to xml, csv, dat, excel, txt, and/or the like. In further implementations, such data 202 may be integrated into a Matlab data file.

In one implementation, the DPST may instantiate a DPST platform and retrieve a DPST user interface template 203, e.g., by accessing a library of DPST calculator components, as discussed in FIGS. 3B-3C.

In one implementation, the DPST server 210 may provide a user interface (UI) for user individualized parameters input 204. For example, as shown at 401-402 in FIG. 4A, the DPST server 210 may prompt the user 220 to enter individualized parameters 206 such as but not limited to assumed 10 year US treasury yield, time horizon, and/or the like. In further implementations, as shown at 503/505 in FIGS. 5A-5B, the user may enter, via a sliding bar widget, target characteristics of the fixed income portfolio, and/or portfolio constraints.

In one embodiment, the user 220 may operate a user device 230, which may include any of a desktop computer, a laptop computer, a tablet computer, a Smartphone (e.g., a BlackBerry, an Apple iPhone, a Google Android, a HTC, a Samsung Galaxy, etc.), and/or the like. In one implementation, the user 220 may input customization parameters 205 including market assumptions via a UI at the user device 250, which may in turn provide the user configured parameters (e.g., market assumptions) 205 to the DPST server 210.

For example, the user device 250 may generate a (Secure) Hypertext Transfer Protocol ("HTTP(S)") message including user input market assumptions 205 in the form of data formatted according to the eXtensible Markup Language (XML). An example listing of a user market assumption input message 205, substantially in the form of a HTTP(S) message including XML-formatted data, is provided below:

```
POST /market_assumption.php HTTP/1.1
Host: 192.168.23.126
Content-Type: Application/XML
Content-Length: 867
<?XML version = "1.0" encoding = "UTF-8"?>
<market_assumption>
   <session_id> HUUUSDWE </session_id>
   <user_id> JS001 </user_id>
   <timestamp>2020-12-31 23:59:59</timestamp>
   <user_accounts_details>
       <user_account_credentials>
           <user_name>JohnDaDoeDoeDoooe@gmail.com</account_name>
           <password>abc123</password>
           //OPTIONAL <cookie>cookieID</cookie>
           //OPTIONAL <digital_cert_link>www.mydigitalcertificate.com/
JohnDoeDaDoeDoe@gmail.com/mycertifcate.dc</digital_cert_link>
```

```
            //OPTIONAL <digital_certificate>_DATA_</digital_certificate>
        </user_account_credentials>
    </user_accounts_details>
    <client_details> //iOS Client with App and Webkit
        <client_IP>10.0.0.123</client_IP>
        <user_agent_string>Mozilla/5.0 (iPhone; CPU iPhone OS 7_1_1 like Mac
OS X) AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>DPST.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac
OS X) AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus
S Build/IMM76D) AppleWebKit/534.30 (KHTML, like Gecko) Version/4.0 Mobile
Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-XXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-XXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <portfolio_id> FI-001 </portfolio_id>
    <portfolio_name> my_fixed_income </portfolio_name>
<portfolio_assumptions>
        <ending_10_year_yield> 4.5% </ending_10_year_yield>
        <time_horizon> 1 year </time_horizon>
        <yield_value> custom </yield_value>
        <historical_percentile> 24% </historical_percentile>
        ...
    </portfolio_assumptions>
...
<market_assumption>
```

In one implementation, the user 220 may optionally submit user objective parameters, portfolio constraints (e.g., minimum or maximum weight, etc.) 209 to the DPST server 210. In another implementation, the DPST server 210 may calculate performance range to set ranges for sliding bar widgets 206 (e.g., see FIGS. 3B-3C), and return the UI widgets 207 (e.g., sliding bar, etc.) with customized ranges to the user device, e.g., see 503, 505 in FIGS. 5A-5B, etc. An example listing of the UI widget message 207, substantially in the form of a HTTP(S) message including XML-formatted data, is provided below:

```
POST /ui_widget.php HTTP/1.1
Host: 192.168.23.126
Content-Type: Application/XML
Content-Length: 867
<?XML version = "1.0" encoding = "UTF-8"?>
<ui_widget>
    <session_id> HUUUSDWE </session_id>
    <user_id> JS001 </user_id>
    <timestamp>2020-12-31 23:59:59</timestamp>
    <user_accounts_details>
        <user_account_credentials>
            <user_name>JohnDaDoeDoeDoooe@gmail.com</account_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
        <client_IP>10.0.0.123</client_IP>
        <user_agent_string>Mozilla/5.0 (iPhone; CPU iPhone OS 7_1_1 like Mac
OS X) AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>DPST.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac
OS X) AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus
S Build/IMM76D) AppleWebKit/534.30 (KHTML, like Gecko) Version/4.0 Mobile
Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-XXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-XXXXXXXXXXXX</client_UDID>
        <client_OS>Mac OS X</client_OS>
```

```
        <client_OS_version>10.9.3</client_OS_version>
        <client_app_type>web browser</client_app_type>
        <client_name>Mobile Safari</client_name>
        <client_version>537.75.14</client_version>
    </client_details>
    <widget_1>
        <widget_type> sliding bar </widget_type>
        <variable> yield </variable>
        <variable_min> 2.7% </variable_min>
        <variable_max> 6.5% </variable_max>
        <hard_min> 0.7% </hard_min>
        <hard_max> 63.5% </hard_max>
        <format>
            <length> 20 </length>
            <width> 2 <width>
            <bar>
                <height> 4 </height>
                <width> 2 </width>
                ...
                <color> grey </color>
            </bar>
            <color> grey </color>
            ...
        </format>
        ...
    </widget_1>
    <widget_2>
        <widget_type> sliding bar </widget_type>
        <variable> yield </variable>
        <variable_min> 0.86% </variable_min>
        <variable_max> 5.22% </variable_max>
        <hard_min> 0.7% </hard_min>
        <hard_max> 63.5% </hard_max>
        <format>
            <length> 20 </length>
            <width> 2 <width>
            <bar>
                <height> 4 </height>
                <width> 2 </width>
                ...
                <color> grey </color>
            </bar>
            <color> grey </color>
            ...
        </format>
        ...
    </widget_2>
    ...
</ui_widget>
```

In one implementation, the user may input user parameters via the sliding bars with customized sliding ranges, e.g., for target yield, returns, duration, volatility, and/or the like. For example, the target characteristics parameter target yield comprises the aggregate annual yield that the user would want to derive from their portfolio, which could depend upon spending requirements and desired potential income. The aggregate portfolio yield is the weighted average of the yields of the fixed income asset subclasses that comprise the sample portfolio. The user may either construct a portfolio by targeting a specific yield (say 5%) or may just seek to maximize the yield if they don't have any specific spending requirements. In another example, the parameter target return allows a user to specify objectives for total return, which is the total wealth benefit derived from holding the portfolio. The portfolio return is the weighted average of the returns of the fixed income asset subclasses that comprise the sample portfolio. The optimization for target return may highly depend upon the assumption inputs for Treasury yield, horizon and credit spread a user choose as it uses the building blocks of return, described above to solve for the target return. A user may target a specific return or can choose to maximize it. In another example, the target duration is the total interest rate sensitivity of the portfolio, which gives a measure of total return expected to be observed in the portfolio with 1% change in interest rates. It is calculated as the sum of product of portfolio weights and individual asset level durations. In another implementation, a user may target a specific duration in the portfolio or may choose to minimize it.

For another example, the parameter target volatility may include portfolio volatility, which a measure of dispersion or variance in your portfolio returns. It depends upon the portfolio composition, how volatile the fixed income asset subclasses are in the portfolio and lastly the correlation among the asset returns. A user may create a portfolio by specifying target variability in the returns or can just choose to minimize it.

An example listing of the user configured parameter message 209, substantially in the form of a HTTP(S) message including XML-formatted data, is provided below:

```
POST /user_parameter.php HTTP/1.1
Host: 192.168.23.126
Content-Type: Application/XML
Content-Length: 867
<?XML version = "1.0" encoding = "UTF-8"?>
<user_parameter>
    <session_id> HUUUSDWE </session_id>
    <user_id> JS001 </user_id>
    <timestamp>2020-12-31 23:59:59</timestamp>
    <user_accounts_details>
        <user_account_credentials>
            <user_name>JohnDaDoeDoeDoooe@gmail.com</account_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
        <client_IP>10.0.0.123</client_IP>
        <user_agent_string>Mozilla/5.0 (iPhone; CPU iPhone OS 7_1_1 like Mac
OS X) AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>DPST.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac
OS X) AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus
S Build/IMM76D) AppleWebKit/534.30 (KHTML, like Gecko) Version/4.0 Mobile
Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-XXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-XXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <user>
        <name> John Smith </name>
        <DOB> 1970-10-21 </DOB>
```

```
    <gender> m </gender>
    <address>
        <street> 111 Palm Street </street>
        <city> Palm Beach </city>
        <state> CA </state>
        <zipcode> 00000 </zipcode>
        ...
    </address>
    ...
<portfolio_id> FI-001 </portfolio_id>
<portfolio_name> my_fixed_income </portfolio_name>
<portfolio_target>
    <yield> 4.53% </yield>
    <return> 3% </return>
    <duration> 6.06 </return>
    <volatility> 5.7% </volatility>
    ...
</portfolio_target>
<portfolio_constraints>
    <US_treasury> 70% </us_treasury>
<us_agg> 70% </us_agg>
    <us_corp_ig> 70% </us_corp_ig>
    <us_high_yield> 50% </us_high_yield>
    <em_bonds> 50% </em_bonds>
    <global_agg> 50% </global_agg>
    ...
</portfolio_constraints>
...
</user_parameter>
```

In one implementation, the DPST may calculate portfolio weights 212 and save to the DPST database 219. For example, in one implementation, an exemplary listing, written substantially in the form of PHP/SQL commands, to store the DIA purchasing record data 212 to the DPST database, is provided below:

```
<?PHP
header('Content-Type: text/plain');
...
// store input data in a database
mysql_connect("201.408.185.132",$DPST_server,$password); // access database server
mysql_select("DPST_DB.SQL"); // select database to append
mysql_query("INSERT INTO AllocationTable (timestamp, portfolio_id,
portfolio_name, 10_year_ending_yield, time_horizon,
yield_value,target_yield,
target_return, us_treasury_weight, us_agg_weight, us_corp_weight,
us_high_yield, em_bonds_weight, global_agg_weight, ...)
VALUES ($timestamp, $portfolio_id, $portfolio_name,
$10_year_ending_yield,
$time_horizon, $yield_value, $target_yield, $target_return,
$us_treasury_weight, $us_agg_weight,
$us_corp_weight, $us_high_yield,
$em_bonds_weight, $global_agg_weight, ...); // add data to
RiskBoundaryTable table in a CLIENT database
mysql_close("DPST_DB.SQL"); // close connection to database
?>
```

Within implementations, the DPST may provide the portfolio allocation weights to the user, e.g., in a graphic presentation 211.

Figure 8A:
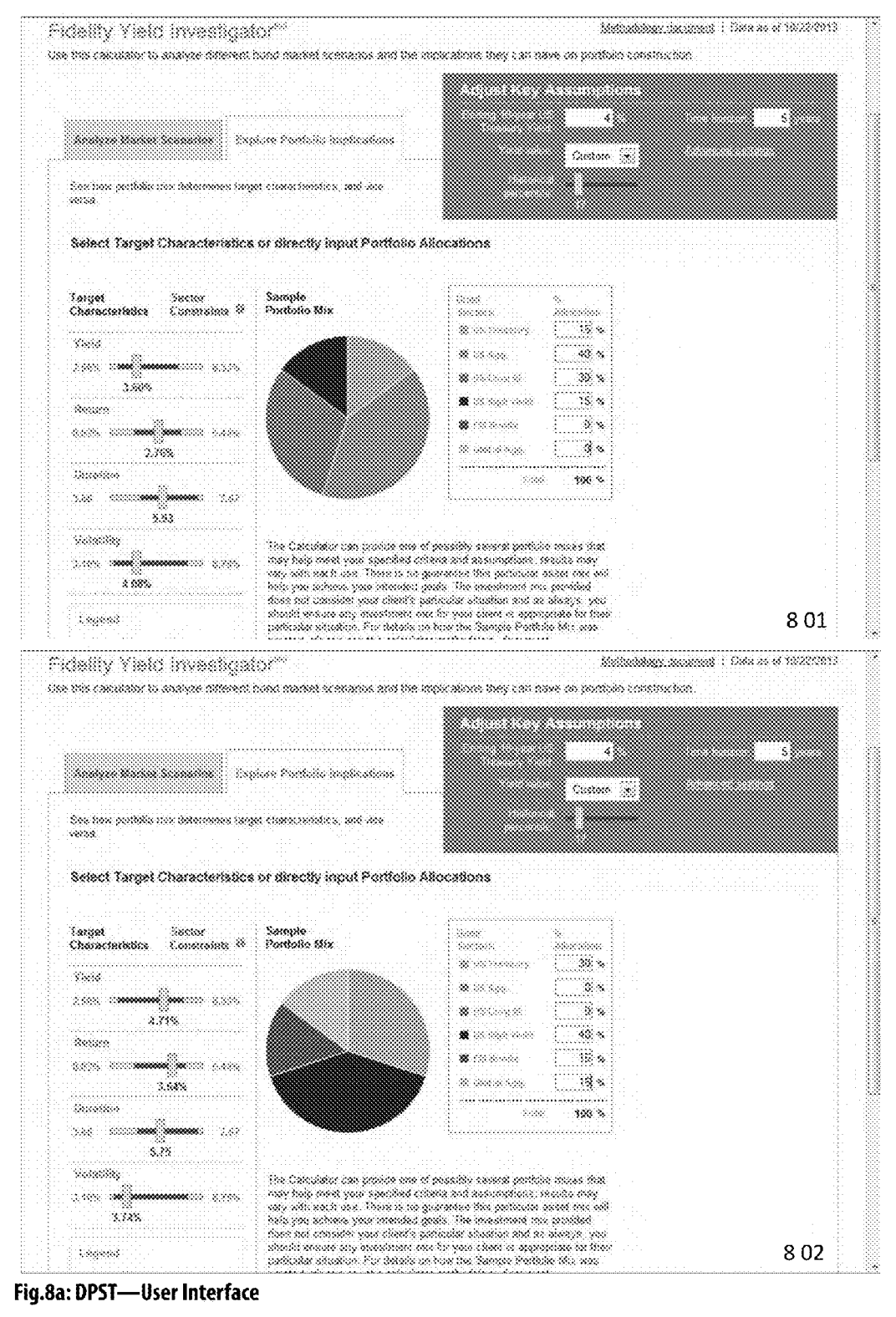

FIG. 2B provides an exemplary diagram illustrating data structure of market index data in the DPST database within embodiments of the DPST. Within implementations, the DPST may employ and maintain data in a database, e.g., an Oracle database, see e.g., 219 in FIG. 2A, 819 in FIG. 8, etc. In one implementation, the DPST may maintain an index data table (e.g., see 819c in FIG. 8), which may include a hierarchy of sub-tables as shown in FIG. 2B.

For example, the DPST may use certain widely known market indices to represent corresponding fixed income asset subclasses. The DPST may obtain indices used to represent fixed income asset subclasses as discussed in Table 1:

TABLE 1

Exemplary Data Indices

| Fixed Income Asset Subclass | Representative Index |
|---|---|
| US Treasury bonds Barclays US 7-10 Year Treasury Bond Index | Barclays US 7-10 Year Treasury Bond Index |
| US Treasury Inflation Protected Securities | Barclays US 1-10 Year TIPS Index (Series-L) |
| US Bond Aggregate | Barclays US Aggregate Bond Index |
| US Corporate Bonds | Barclays US Corporate Investment Grade Total Return Index |
| US High Yield Bonds | Bank of America Merrill Lynch US High Yield Master II Index |
| Emerging Market Debt (Hard Currency) | JP Morgan Emerging Markets Bond Index Global |
| Global Bond Aggregate ex US (Local currency, Un-hedged) | Barclays Global Aggregate Excluding US (un-hedged) Index |

For each index, the DPST may be provided with daily data items such as, but not limited to yield, maturity, duration, total return over the past day, and/or the like. For example, when bonds are held over any given horizon, several forms of gain or loss accrue to the holder, such as, but not limited to yield, roll, yield change, loss upon default, and currency translation, and/or the like. The calculator may estimate the magnitude of each of these effects on an annualized basis out to the user-specified horizon.

For example, the yield data field may include income, consisting of bond coupon, which is paid to the holder. For a horizon of 1 year, yield equals the initial prevailing market yield. For longer horizons, yield may be higher or lower, depending on whether rates are assumed to rise or fall, respectively. For another example, the roll data field may include effect of bonds drawing closer to maturity, all else equal. For example, when an investor purchased a 10 year bond and hold it, after one year it only has nine more years remaining till it matures. The bond has "rolled down" its yield curve. And since the yield on a 9 year bond is generally slightly less than that on a 10 year bond, its price may be correspondingly higher. This potential price increase is an unrealized gain to the bond holder.

In one implementation, the index data table 251 in include a MARKET_INDEX sub-table 251a, which may include more than 700 rows, and contain entries for various indexes for DPST. This table's contents may be reloaded based on file feed.

In one implementation, the index data table may further include an INDEX_PRICE sub-table 251b, which contains data needed by the DPST calculation, such as NAV_AM (e.g., net asset value, etc.) and PERCENT_DIFF_AM (e.g., return, etc.). Entries for this table are provided by a daily file feed. As this table is loaded daily, and other DPST data may not be updated on a daily basis, the most recent rows from this table may not be directly incorporated into the calculation. Instead, DPST may pull the data from the rows where the INDEX_PRICE. EFF_DT=INDEX_ATTRIBUTE. AS_OF_DT (e.g., when index price effective date is the same as that of the index attribute).

In one implementation, an INDEX_ATTRIBUTE sub-table 251c may hold index-level data general information needed by DPST. This data may logically be added to MARKET_INDEX 251a, but columns may not be added to table 251a that will only be filled out for some of the more than 700 indices. Each row for an index on the INDEX_ATTRIBUTE table 251c may indicate that the corresponding index may be used by the DPST calculation. For example, there may be one row on this table for each index it uses, plus an additional row for the 10 Year Treasury. The indices rows on this table are also represented on MARKET_INDEX.

In one implementation, this table may also hold values needed by the DPST which are the results of daily-"raw"-data-based calculations done by the Stored Procedure. This "pre-calculated" data represents results that are based on the "most recent day"s worth of data, which will remain valid until new raw data is loaded. These results could have been calculated in the business service, but are being pre-calculated and stored here for performance reasons.

In one implementation, the DPST may not store these calculated values for each past historical day; only the values as of the AS_OF_DT, which are the ones needed for the DPST. This data will be used in conjunction with daily "raw" data held on INDEX_ATTRIBUTION_DETAIL 251d and the user-entered Time Horizon, Assumed Future Treasury Yield, and index Assumed Future Credit Spreads to calculate expected returns for the page Bar Chart.

In one implementation, the INDEX_ATTRIBUTE table 251c may have a sub-table INDEX_ATTRIBUTE_DETAIL 251d, which may hold dated "raw" daily data for the DPST, the sort of data to receive in a daily feed process at some future point.

In another implementation, the INDEX_ATTRIBUTE table 251c may have a sub-table INDEX_PERCENTILE 251d, which may hold Stored Procedure calculated percentile ranking/credit spread pairs, for use by the browser Future Treasury Yield and Index slider controls for the bar chart results (e.g., see 404 in FIG. 4B). It includes entries for tvarious indexes, and for the 10 Year Treasury, and/or the like. The number of datapoints to be created for each index may be determined at run time based on a parameter stored in FFP_PARAMETERS 251h.

In one implementation, the INDEX_CORRELATION sub-table 251f may hold the matrix of index-to-index correlation numbers (-1 to 1), for use in Portfolio Volatility calculations. These entries may also be calculated by the Stored Procedure. The full set of correlations may be stored, e.g., 7 sets of rows for each index, 7 rows per index (total 49 rows), and/or the like. So, if there is an entry keyed as "Index A"/"Index B", then there may also be an entry keyed as "Index B"/"Index A". The 2 entries may have the same correlation value.

In one implementation, an INFLATION table 251g may hold the daily inflation rates; an FFP_PARAMETERS table 251h may hold the Recovery Rate parameter for DPST use, and the parameter for the number of datapoints to create for each index in the INDEX_PERCENTILE table 251e, which may be used as input to the Stored Procedure that creates these table rows.

In one implementation, the INDEX_ATTRIBUTE_WIP 251i, and INDEX_ATTRIBUTE_DETAIL_WIP 251j, may hold "raw" data and maintain the most up-to-date data updates, e.g., there are WIP (Work-In-Progress) versions of these tables. The WIP tables may have the same layouts as the non-WIP versions of the same tables. New "raw" data may be loaded to the WIP tables, and then when the data load is completed, the WIP table contents may be merged with the non-WIP table contents.

Within implementations, the data tables 251a-j may be processed using a SQL loader. For example, MARKET_INDEX 251a and INDEX_PRICE 251b, data may not be loaded daily to the new tables, as DPST may not have an automatic daily feed for this data. Instead, raw data may be loaded approximately once a month. The month's new raw data will be made available to us on a formatted spreadsheet. There may be a SQL Loader script to load the "raw" data from the spreadsheet to the INDEX_ATTRIBUTE (AS_OF_DT only) and the INDEX_ATTRIBUTE_DETAIL, and INFLATION tables.

In one implementation, the DPST may employ an Index Stored Procedure, e.g., an on-demand Stored Procedure. This stored procedure may be invoked after the SQL Loader process has completed. The Stored Procedure may do the following: check that rows exist on the INDEX_ATTRIBUTE_DETAIL table 251d for every index found on the INDEX_ATTRIBUTE table 251c, where the INDEX_ATTRIBUTE_DETAIL. EFF_DT=the INDEX_ATTRIBUTE. AS_OF_DT.

The stored procedure may then check that rows exist on the INDEX_PRICE table 251b for every index found on the INDEX_ATTRIBUTE_TABLE 251c where the TREASURY_IN=N, and where the INDEX_PRICE. EFF_DT=the INDEX_ATTRIBUTE. AS_OF_DT.

The stored procedure may then Update INDEX_ATTRIBUTE_DETAIL 251d as required (e.g., calculating YIELD_PT and LOWER_YIELD_PT for any row where the UNADJ_YIELD_PT column is non-null and the YIELD_PT column is null; i.e., for the TIPSindex); and update the calculated derived-data columns on INDEX_ATTRIBUTE 251c. The stored procedure may then delete the existing contents of the INDEX_PERCENTILE 251e table, and create new rows for the table; delete the existing contents of the INDEX_CORRELATION_AGG table 251f, and create new rows for the table.

The stored procedure may then merge the WIP table contents with the INDEX_ATTRIBUTE 251c and the INDEX_ATTRIBUTE_DETAIL 251d tables, and commit all changes to all tables.

In one implementation, the DPST may implement SQL scripts to load certain datapoints on release, which are neither available from the formatted spreadsheet for upload via SQL Loader, nor calculated by the Stored Procedure. These datapoints may be added via SQL script. Such data points may include, but not limited to INDEX_ATTRIBUTE: CURRENCY_RETURN_PT, index indicators TREASURY_IN and TREASURY_BASED_IN, FFP_PARAMETERS, the rows for the Recovery Rate and the parameter for the number of percentile datapoints to create per index, and/or the like.

In one implementation, the DPST may communicate with a remote server for performance calculation, e.g., a Mathworks MatLab server. This vendor application may be used to perform Portfolio Weight calculations when the end-user enters a Target (maximize Yield, minimize Volatility, etc.) and clicks the Solve button. In one implementation, MatLab components may be accessed via an API. Request and response structures will be configured within MatLab for use with this API to allow for receiving and returning data from a calculation component, e.g., the portfolio composition calculator, e.g., see FIG. 3B-3C.

FIG. 3A provides a logic flow diagram illustrating interactive process flows between a user/investor and the DPST server for portfolio composition calculator within embodiments of the DPST. In one implementation, the DPST server may periodically, intermittently, constantly, and/or on an on demand basis, update market index data, historical bond performance data, etc. with a data provider. For example, the DPST server may send a data request 301 (e.g., see 201 in FIG. 2A, etc.) to the data provider (e.g., Bloomberg, NYSE, etc.), which may in turn aggregate and provide market index data 302 to the RT-SUM server. The DPST may analyze historical market index data 303, and integrate them into the database, e.g., see data tables 251a-f in FIG. 2B.

In one implementation, a user (e.g., an investment professional, an individual investor, etc.), may initiate a DPST component 304 at a user device, e.g., a mobile application, a web browser based application, etc. The user may submit portfolio parameters, e.g., market assumptions such as interest rate, investment objective, investment constraints, etc. 305. For example, as shown at 401-402 FIG. 4A, the user may configure an assumed 10-year US treasury yield, time horizon; as further shown at the sliding bar 503, 505 in FIGS. 5A-5B, the user may configure the garget yield, return, duration, volatility, etc. of the portfolio, and/or the like.

In one implementation, the DPST server may execute fixed income portfolio calculator based on the user configured parameters 308 (e.g., see FIGS. 3B-3C). When the user configured objective is achievable 309, the DPST may generate bond allocation weights to achieve the objective 312. Otherwise, the DPST may generate and provide an unavailable message to the user 311, e.g., by grey out the sliding bar, etc. In one implementation, the DPST may display the portfolio allocation weight to a list of available fixed incomes 313 to the user. Upon reviewing the allocation, the user may provide feedback and optionally submit portfolio adjustment 314, e.g., in a similar manner as in 305. The DPST may then re-execute the portfolio calculation to provide bond allocation weights 316.

FIGS. 3B-3C provide a logic flow diagram illustrating aspects of interactive process flows between a user and the DPST server to generate dynamic user interface for fixed income portfolio yield calculation and evaluation within embodiments of the DPST. Within implementations, the DPST may receive an indication to launch the calculator component, and initiate a DPST template 321. For example, the DPST template may comprise a previously stored web page, which may be served to a browser at the user device, e.g., 322. The template page may be framed by headers, left panel, footers, and/or the like.

In one implementation, on loading in the browser, the first tab of the page may be displayed, e.g., an Expected Return tab. The DPST may then immediately make an AJAX request to calculate range parameters for UI widgets such as the sliding bars (e.g., see the sliding bar 503 in FIG. 5A, etc.), e.g., 323. For example, the DPST may access a library and calculate an endpoint for the sliding bar. The endpoint may be part of the DPST Controller. The Controller returns the list of index market codes (MKT_INDEX_CD) for the indexes currently in use from the Properties artifact, and includes the codes as variables on the served page. In one implementation, the entries in Properties could be replaced in the future by a call to a new component to get the list of indexes. The page also may be hard-coded on itself the default Time Horizon figure (0 years). It should be noted that the sliders may have hard minimum maximum values 503b and then have dynamic, e.g., "soft" minimum maximums 503c from the DPST's calculation range. This assists the user to easily understand the quantifiable tradeoffs that are available for a user in hard versus soft criteria available to the user. In another embodiment, this would allow a user to instantly see and discern how the selection of filtering criteria effect their list of choices; for example, if a user is looking to purchase lamps on Amazon or eBay, and they receive 2,000,000+ matching results, and then add the constraints 503d of only seeing lamps costing under $100, and having non-cloth lamp shades, a slider may show the hard min-max slider going from $0 to $500, but a dynamically highlighted area from $15 to $100 where matching lamps exist, and scrubbing through that dynamic slider range will show the user only matching lamps fitting those constraints.

Once it has the list of indexes, the DPST Template then makes an AJAX call to an endpoint calculation function in the library. The call includes the list of indexes from the variables on the served page, e.g., 323.

In one implementation, the DPST may profess the inquire AJAX request, and retrieve index data from the database e.g., 324. For example, the DPST may call the new IndexPercentileInquire component, including the list of indexes on the request. This component retrieves the basic Index data (market code, index name, etc.) and the Index/Percentile information from the Index Summary/Index Percentiles tables. The response also includes the DISPLAY_ORDER_NO and DEFAULT_PORTFOLIO_PT. The DPST returns this data in JSON format to the browser.

In one implementation, on receipt of the Percentiles JSON response, the DPST may immediately make a second AJAX call to the endpoint calculator component, e.g., 325 to calculate returns. This call includes the index list, plus defaults for the expected user input—the default Time Horizon figure that was included on the page when served, plus the Current Yield/Credit Spread figures for the indexes and the Future Treasury Yield.

In one implementation, the DPST may receive the AJAX request to calculate returns, and invoke a return calculation function from the library accordingly, e.g., 326. For example, the DPST may call the new IndexHypotheticalReturnsCalculator component. The DPST includes the information passed it on the AJAX call in the request—index list, default Time Horizon, current Yield and current Credit Spreads, and/or the like. The calculator component returns the calculated expected results for each index. This equates to the FIGS. in the "Expected Returns" grid on Anshul's spreadsheet. In addition, the service will also retrieve from the Oracle Database and return the Duration and Volatility for each index. In one implementation, the Duration and Volatility may be returns as-is from the database, as they are not affected by user input. In turn, the DPST returns these results in JSON format to the browser.

In one implementation, when the DPST Template receives the second AJAX response, it calculates and displays the Index Bar Chart in left-to-right DISPLAY_ORDER_NO, and uses the Percentile figures to set up the Future Treasury Yield and Index Future Credit Spread Sliders, with initial values in the associated entry fields, e.g., 327. In this way, the user interface page is enabled for user input, e.g., see sliding bars 503 and 505 in FIGS. 5A-5B.

In one implementation, the DPST may receive user entered new parameters, e.g., a new Time Horizon, to reset the Future Treasury Yield using either the associated slider or entry field, and/or to reset one or more Index Future Credit Spreads, again using either the associated sliders or entry fields. On each such action (field entry, slider adjustment), the Template may again call the return calculator component endpoint to have the expected returns recalculated, and then display the results, e.g., 329.

In one implementation, upon providing the initial user interface page, if the user selects the portfolio construction option 330, e.g., when the user feels that the Time Horizon, Future Treasury Yield and Index Future Credit Spreads are to his liking, the user may click the page tab control to switch to the Portfolio Construction tab. The user may enter a Target type value, to have the DPST calculate portfolio percentage weights. As part of doing so, the user may also set index-level min/max Weight constraints. Alternatively, the user may simply enter the portfolio percentage weights himself.

For example, portfolio construction section allows users to examine portfolio-level implications of their bond market calculations. Users may do so in 2 ways—by either (a) entering a portfolio mix, i.e., allocations to each of the bond indexes available in DPST, to examine the resulting portfolio characteristics of yield, return, duration and volatility, or by (b) invoking the calculator to determine a portfolio mix that achieves target levels on yield, return, duration or volatility.

Once these are entered, the user may click the Solve button 333, which may trigger the DPST to make a call to invoke the "calculateportfolio" endpoint function, passing sets of parameters.

For example, if a target was entered 334, the DPST may pass parameters including, but not limited to target type and value (either a minimum/maximum indicator or a numeric value), DEFAULT_PORTFOLIO_PT for each index, list of by-index weight constraints, the expected returns grid of data, the index duration and volatility, and/or the like, e.g., 336.

Alternatively, continuing on with FIG. 3C, when no target type is provided 334, but the portfolio weights were directly entered by the user, the DPST may pass on list of weight-by-index values, the expected returns grid of data, the expected returns grid of data, the index duration and volatility, and/or the like, e.g., 337 to the portfolio calculation function. Upon receipt of the DPST/PortfolioComposition-Calculator AJAX request, the DPST may process the portfolio composition calculation, e.g., calling the IndexPortfolioCompositionCalculator component.

In one implementation, following up from 336 when a target type request is provided, then the DPST may call a remote server (e.g., a Matlab server, etc.) via MatLab API using the request information (target type & value, weight constraints, expected returns data), and/or the like, e.g., 341. The Matlab server may return the set of calculated portfolio weights. If a directly-entered weight type is included in a request, then the DPST may not need to call MatLab.

In one implementation, when the DPST has obtained the set of portfolio weights, the DPST may retrieves the index correlation matrix figures (e.g., see 251*f*) from the DPST Database (e.g., calculated by the Stored Procedure), and uses them in conjunction with the passed index volatility figures to call the MatLab server again to calculate the portfolio volatility, e.g., 342. The MatLab server may return the portfolio volatility as a singe value.

In one implementation, the DPST may return the portfolio weights list, the portfolio volatility, and the other portfolio-level summary figures. The DPST may then return the same response data in JSON format to the browser, wherein an exemplary JSON data message may include the returned the portfolio weights list, the portfolio volatility, and the other portfolio-level summary figures.

In one implementation, the DPST may use the returned portfolio weights to generate and display graphic presentations 344, e.g., the result portfolio pie chart (e.g., see 507 in FIG. 5A, etc.), and displays the returned Portfolio level data, including Volatility and other portfolio-level summary figures. Portfolio weights are displayed for indexes in index DISPLAY_ORDER_NO.

FIG. 2C provides a data plot diagram illustrating aspects of yield analysis within embodiments of the DPST. Within implementations, the DPST may "roll" a fixed income instrument for portfolio performance calculation within the duration of the fixed income, e.g., a bond. For example, "roll" is the portion of a bond's price change that is attributable to its finite maturity, e.g., see 271. Unlike, e.g., common stocks, which confer permanent ownership of the issuing corporation, bonds represent a debt of the issuer, which almost always has a stated maturity. For example, the 2.9% 10 year US Treasury note has a maturity of 10 years. And since yield varies with maturity (this relationship is captured by the yield curve), passage of time implies a change in yield, which in turn implies a price change.

For example, consider the Barclays US Aggregate Bond Index, at any given moment it is comprised of thousands of bonds. With every passing day, each of those bonds moves closer to maturity by one day. Hence as time passes, an investor who is exposed to the Barclays Agg will experience roll, much like the investor who buys and holds a single bond. It is just as meaningful to talk about the maturity of an index as represented by the weighted average maturity of its constituent bonds, and hence its roll, as of an individual bond.

In another implementation, the composition of any bond index may change throughout the year as new bonds are issued and get included; existing bonds mature or default and are henceforth excluded; bond characteristics like perceived credit quality change; and the index owner rebalances the mix of bonds in keeping with the index's overall objectives and intended character. Specifically, Barclays may carefully watch the mix of bonds within its namesake Aggregate bond index, to keep their weighted average maturity within a narrow range. So an investor in the Barclays Agg may not see their bonds roll down all the way to maturity. In one implementation, the DPST knows the maturity of each bond index, and assumes that index maturity remains constant from one year to the next, and that during a year, investors in the bond index experience one full year of roll. The DPST may not take into consideration daily changes in the indices' average maturity. For example, when considering a fixed income asset subclass where the index maturity is 10 years, the computed roll corresponds to a reduction in index maturity from 10 to 9 years, as if the index holds its composition of bonds steady for one year, and then rebalances back to a 10 year average maturity. As such, the DPST may calculate roll annually depending on the user's time horizon so an investor with a 15 year horizon may then experience this year of roll 15 times.

In one implementation, to estimate the yield of each index following one year of roll, all else equal, the DPST may identify another index whose characteristics come closest to the primary index, while having a maturity one year shorter. So for US treasury bonds, where the primary index the "Barclays US 7-10 Year Treasury Bond Index" is employed, the DPST may impute the roll-down yield from a "Barclays US 6-9 Year Treasury Bond Index". When such index is not available, the DPST may rely on a secondary index that most closely aligns with the primary index and adjust accordingly.

TABLE 2

Exemplary Data Indices

| Fixed Income Asset Subclass | Representative Index |
|---|---|
| US Treasury bonds | Barclays US 1-4 Year Treasury Bond Index |
| Barclays US 7-10 Year Treasury Bond Index | |
| US Treasury Inflation Protected Securities | Barclays US 1-5 Year TIPS Index (Series-L) |
| US Bond Aggregate | Barclays US Aggregate Bond Index (1-3 year) |
| US Corporate Bonds | Barclays US Corporate Investment Grade Total Return Index - Intermediate |
| US High Yield Bonds | Bank of America Merrill Lynch US High Yield Master II Index (0-1 Y) |
| Emerging Market Debt (Hard Currency) | JP Morgan Emerging Markets Bond Index Global - Intermediate |
| Global Bond Aggregate ex US (Local currency, Un-hedged) | Barclays Global Aggregate Excluding US (un-hedged) Index (1-3 Y) |

In one implementation, where the maturity difference between the primary and secondary indices is greater than one year, the DPST may impute the roll-down yield by interpolation. So if the secondary index has a maturity that is 2 years shorter than the primary index (instead of the desired 1 year shorter) then the DPST may use the midpoint of their two yields to approximate the postroll-down yield.

In one implementation, the DPST may take the difference between the roll-down yield and the initial yield, multiply this difference by the bond index duration to determine the hypothetical annualized roll down effect, assuming that the duration of the bond index remains fixed at its initial level and that the same duration applies to the index one year later at its rolled-down bond yield. In short, the DPST may assume that the yield curve will move in parallel so for any move in interest rates, there will be the same incremental effect on bonds across both maturities.

In one implementation, yield curves may slope upward, e.g., a higher yield for owning bonds of longer maturity. Then truly roll "down" the curve towards shorter maturity, and experience a resulting price increase. However, there are times, particularly in certain recessions or a sharp monetary tightening, when yield curves slope downward, e.g., lower yield for owning bonds of longer maturity. Then the DPST may roll "up" the curve, with a resulting price decrease. As such, if the yield curve was to slope downward, the DPST would capture this market environment and represent a negative roll accordingly.

In one implementation, the DPST may study the yield change, e.g., as shown in FIG. 2C, the effect of market trend in bond yield. It is well known that when yields rise, bond prices fall, and vice versa, all else equal. A bond's (or bond index's) duration measures the strength of this relationship at any point in time. Note that duration provides an approximation of this relationship and assumes that for every movement in interest rates, there is an equal movement in bond price (1 to 1 relationship). The DPST calculator may not take into consideration convexity or the concept that the price/yield relation may not be linear and may vary depending on a number of factors. Via the DPST user interface (e.g., 401-402 in FIG. 4A, etc.), the user provides an assumed level of yields at the end of their assumed horizon. The annualized hypothetical impact of yield change (e.g., 272) is then determined. For example, the user-provided yield (at the user-provided horizon) may be compared to the index's starting yield, and a hypothetical annualized yield change is determined, e.g., when the 10-year maturity bond index has a yield of 5%, and the user provides an assumed yield of 8% and an assumed horizon of 3 years. The yield change is then 3% (=8% assumed−5% current) and the annualized yield change is 1% (=3% change/3 year horizon). In one implementation, the annualized yield change is multiplied by the bond index duration to determine the annualized yield change effect. Continuing the example above, if the index had a duration of 7, the resulting annualized price effect is 0.7% (e.g., 7 duration times 1% per year) or a hypothetical loss of 70 basis points per year.

In another implementation, the DPST may analyze loss upon default (net of recoveries), e.g., effect on bond price of changes in credit quality, including both upgrades and downgrades. The DPST may rely on default and recovery rates upon default that are provided by the user. Baseline or default values are provided as follows: the baseline default rate assumption is ¼ of the credit spread with respect to intermediate treasury bond of the same maturity. The recovery rate, which is the amount of funds recovered from the issuer in case of the default, is modeled as follows: investment grade bond 45%, non-investment grade bond 40%. Since default is a constant rate in the calculator, it does not take into consideration the risk that someone owning a security depending on that unique situation may lose a lot more than the user provided level.

In one implementation, the DPST may employ currency translation, e.g., effect on prices of foreign bonds due to movements in currency exchange rates, which may affect the return of international bonds when these bond returns are quoted in their local currency. User may provides a level, e.g., the baseline or default value being 0.25% per year implying that USD strengthens by 25 basis points (0.25%) per year in the future against a representative basket of foreign currencies.

In further implementations, the DPST may evaluate a series of risk factors. For example, DPST uses certain indices to represent a particular fixed income class. An investor in this type of investment is concurrently subject to both yield and capital gain or loss potential. This is uniquely different than a buy & hold investment in an individual fixed income security which typically has a defined end or maturity date (although may be callable before this date). As such, an investor in an individual fixed income security may buy and hold the security meaning they would collect coupon payments, hold until maturity, and then receive their principal back. They may also decide to sell the security on the secondary market before the maturity and recognize a capital gain or loss. However, in selling away the bond, the investor may lose the coupon payments left on the security. As with any investing, certain risks may be applicable to any fixed income security. In such cases, the DPST may consider risk types as follows:

Default Risk: If a bond issuer fails to make either a coupon or principal payment on its bonds as they come due, it is said to be in default. This could arise in connection with the issuer's bankruptcy or a failure to meet some other provision of the bond indenture, such as a reporting or debt service reserve requirement.

Credit Risk: A bond's credit quality is an important consideration when evaluating investment choices. Credit ratings services may assign a credit rating to a bond and/or a bond issuer based on analysis of the issuer's financial condition and management, economic and debt characteristics, and the specific revenue sources securing the bond. The highest ratings are AAA (S&P) and Aaa (Moody's). Bonds rated BBB/Baa and higher are considered investment grade; bonds with lower ratings are considered higher risk, speculative or high yield. Lowe rated bonds will often have higher yields to compensate investors for increased risk.

Interest rate risk: Interest rate movements almost always have an impact on bond prices. When interest rates rise, the price of existing bonds typically falls. If a user sells their bond into this type of interest rate environment, they may probably get less than you paid for it. The volatility created by interest rate risk is greater for longe term bonds and usually declines as the maturity date gets closer.

Inflation risk: in an environment of high or increasing inflation, a bond investor is at risk of reduced purchasing power, based on future cash flow (coupon payments and principal).

Market risk: market risk is the risk that the bond market as a whole may decline, bringing the value of individual securities down with it, regardless of their fundamental characteristics.

Foreign risk: In addition to the risks mentioned above, there are additional considerations for bonds issued by foreign governments and corporations. These bonds can experience greater volatility, due to increased political, regulatory, market, or economic risks. These risks are usually more pronounced in emerging markets, which may be subject to greater social, economic, regulatory, and political uncertainties.

FIGS. 4A-4B provides exemplary user interface diagrams illustrating exemplary scenarios of portfolio simulations in terms of interest rate variations within embodiments of the DPST. Within implementations, a user may configure expected assumptions for the performance prediction/estimation, e.g., by adjusting the US treasury yield 401, time horizon 402, and/or the like. In one implementation, when interest rates are expected to rise, the user may evaluate whether it is time to move out of the fixed income, depending upon how and when interest rates move. The user may configure the DPST to simulate two scenarios, e.g., when interest rate move by 200 bps in 1 year, the simulation results show there may be huge negative returns across the fixed income spectrum and the user may desire to move out of the fixed income.

Alternatively, as shown in FIG. 4B, the user may configure the same interest rate move on a 5 year horizon 403, and even after the 200 bps move, the results may show that the user may still get around 2% return (annualized) in bonds (even more than that in High Yield and Emerging Markets) 404. The difference may be caused by the following effects: as rates rise slowly, coupons get reinvested at a subsequently higher interest rate which negates the effect of price depreciation; and there may be a component of the bond return, called roll (cyan bars) which is attributable to its finite maturity and hence generating a positive return as a bond gets near to the maturity.

FIGS. 5A-5B provides exemplary user interface diagrams illustrating exemplary scenarios of portfolio simulations for different investment objectives within embodiments of the DPST. In one implementation, when the user may desire to generate a fixed-income portfolio which gives me a 3% annualized return, the user may configure the 3% return with a sliding bar 503. In one implementation, the user may configure the interest rates rise by 200 bps (501) in 5 years (502). The DPST may generate estimation showing that the generated portfolio has a return of 3% but high interest rate sensitivity (duration=6.06) but there is still a room for compression (as shown by dark green bar).

Continuing on with FIG. 5B, if the user slides the duration bar to the left generates a portfolio with same level of target return but much lower interest rate sensitivity (duration), e.g., 505. The new portfolio may shift allocation from US Treasury & Corporate bonds to assets such as US Agg and Global Agg, which has relatively lower duration.

FIGS. 6A-6E provides exemplary user interface diagrams illustrating alternative exemplary scenarios of portfolio simulations for different investment objectives within embodiments of the DPST. For example, as shown in FIG. 6A, assuming the interest rates rise to their historical average in next 5 years, e.g., 601, the user may desire to construct a fixed-income portfolio with a 3% annualized return as investment objective. The DPST may show that the goal is unachievable as the maximum return that can be achieved in this scenario is 1.95% with the above portfolio composition, e.g., 602. However, the light green section in Return bar shows that if the user relaxes the constraints, the goal may be achieved.

For example, as shown in FIG. 6C, when the user increases the maximum possible allocation in High Yield, EM and Global Agg (e.g., 605a-c) from 30% to 50% fulfills the objective and produces a portfolio with 3% return, e.g., 606 in FIG. 6D. In one implementation, the constructed portfolio may have a higher allocation to US High Yield to EM Bonds relative to the previous portfolio.

In another embodiment, the user may move sector allocation constraints. For example, in FIG. 6D, the user may increase the maximum possible allocation in US High-Yield, Emerging Market, and Global Aggregate from 30% to 50%. In some implementations, this may fulfill a user's objective, for example, of a 3% annualized return.

FIGS. 7A-7D provides exemplary user interface diagrams illustrating portfolio diagnostics within embodiments of the DPST. In one implementation, the DPST may provide analytics illustrating how a traditionally constructed fixed income allocation performs against an institutionally designed multi-sector bond allocation in a rising interest rate environment, e.g., with a traditionally constructed fixed income portfolio, interest rates may rise 150 bps (e.g., 701) over the course of the next 5 years (702) and an investor may expect a reasonable return, e.g., 703.

Continuing on with FIG. 7B, with an institutionally designed multi-sector bond allocation, interest rates may rise 250 bps (e.g., 704-705), and still earn the same reasonable amount of return as a traditionally constructed fixed income allocation, e.g., 706.

Continuing on with FIG. 7C, when interest rates rise even further, e.g., 500 bps (707-708), before a traditionally constructed fixed income portfolio would start to experience negative returns, the DPST may observe the return 709.

Continuing on with FIG. 7D, when interests rates rise 650 bps (e.g., 710-711), before an investor would experience negative returns in an institutional constructed multi-sector bond allocation, the DPST may provide the estimated return, e.g., 712.

Figure 8D:
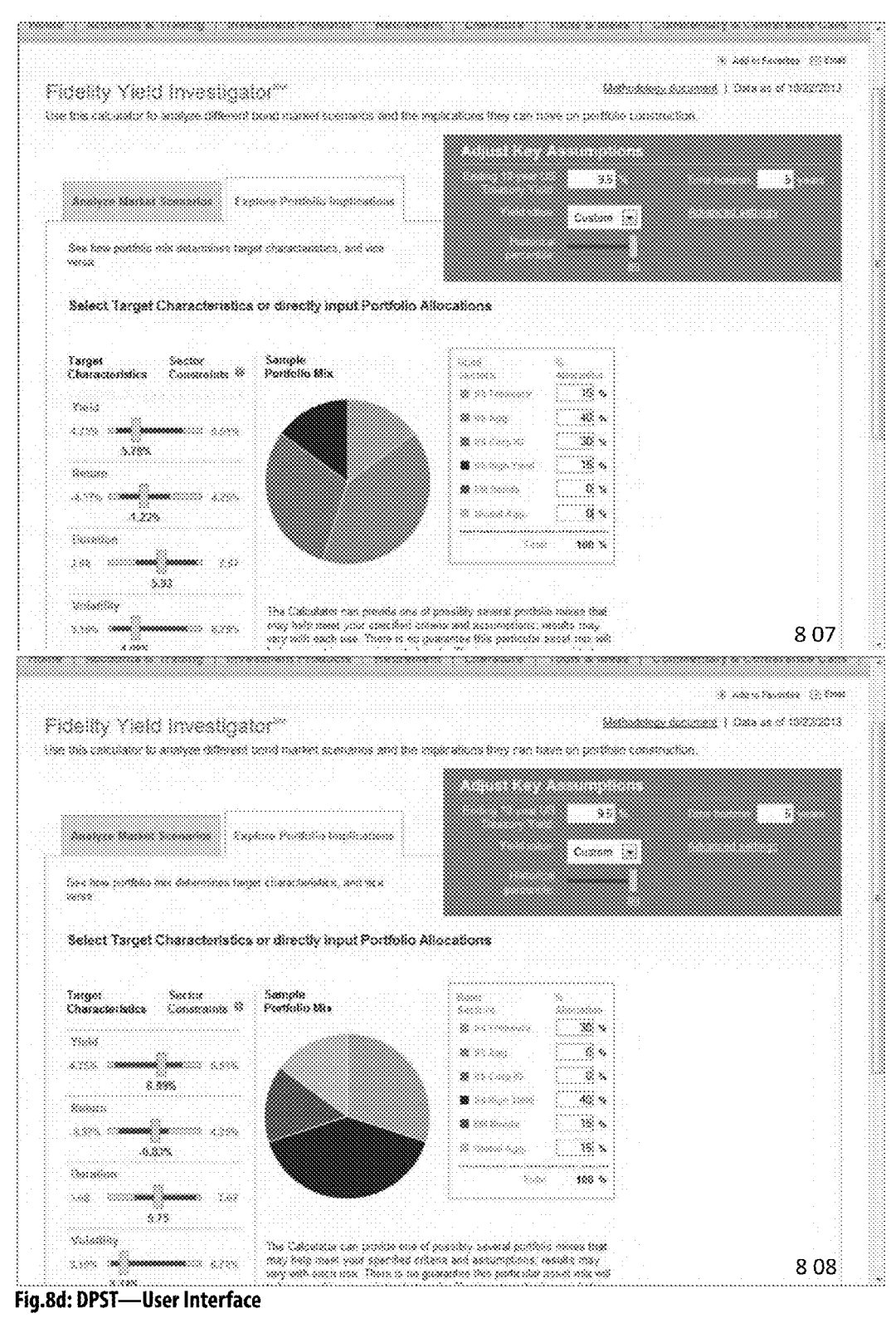

FIGS. 8A-8D provides exemplary user interface diagrams illustrating portfolio performance comparisons in a rising interest rate environment within embodiments of the DPST. In FIG. 8A, screenshots 801 and 802 show a first portfolio and second portfolio, respectively, when interest rates rise 150 bps. In some embodiments, the first portfolio 801 may be a traditionally-constructed portfolio with concentration in investment-grade bonds, while the second portfolio 802 may be a multi-sector portfolio with allocations in less traditional bond sectors. In the shown embodiment, both the first and second portfolios generate a reasonable return of 2.76% and 3.64% respectively. FIG. 8B screenshots 803 and 804 also show the first and second portfolios of FIG. 8A, but this time interest rates rise 205 bps. In some embodiments, the return on the first portfolio may be 2.04% and the return on the second embodiment may be 2.93%. In the shown embodiment, both the first and second portfolios may still generate similar rates of return. In FIG. 8C, the same first and second portfolios are shown as 805 and 806, respectively, but, in this figure, interest rates rise 550 bps. As shown, the return in the first portfolio is −0.13%, while the return in the second portfolio is 0.97%. While the first portfolio experienced a negative return, the return in the second portfolio remains positive. FIG. 8D shows the first portfolio 807 and second portfolio 808 as interest rates rise 700 bps. The first portfolio's return is −1.22%, while the second portfolio's return is −0.03%. As shown, rates rose considerably before the multi-sector portfolio experienced a negative return.

DPST Controller

FIG. 9 shows a block diagram illustrating embodiments of a DPST controller. In this embodiment, the DPST controller 901 may serve to aggregate, process, store, search, serve, identify, instruct, generate, match, and/or facilitate interactions with a computer through asset information technology technologies, and/or other related data.

Typically, users, which may be people and/or other systems, may engage information technology systems (e.g., computers) to facilitate information processing. In turn, computers employ processors to process information; such processors 903 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 929 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the DPST controller 901 may be connected to and/or communicate with entities such as, but not limited to: one or more users from peripheral devices 912 (e.g., user input devices 911); an optional cryptographic processor device 928; and/or a communications network 913.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The DPST controller 901 may be based on computer systems that may comprise, but are not limited to, components such as: a computer systemization 902 connected to memory 929.

Computer Systemization

A computer systemization 902 may comprise a clock 930, central processing unit ("CPU(s)" and/or "processor(s)" (these terms are used interchangeable throughout the disclosure unless noted to the contrary)) 903, a memory 929 (e.g., a read only memory (ROM) 906, a random access memory (RAM) 905, etc.), and/or an interface bus 907, and most frequently, although not necessarily, are all interconnected and/or communicating through a system bus 904 on one or more (mother)board(s) 902 having conductive and/or otherwise transportive circuit pathways through which instructions (e.g., binary encoded signals) may travel to effectuate communications, operations, storage, etc. The computer systemization may be connected to a power source 986; e.g., optionally the power source may be internal. Optionally, a cryptographic processor 926 may be connected to the system bus. In another embodiment, the cryptographic processor, transceivers (e.g., ICs) 974, and/or sensor array (e.g., accelerometer, altimeter, ambient light, barometer, global positioning system (GPS) (thereby allowing DPST controller to determine its location), gyroscope, magnetometer, pedometer, proximity, ultra-violet sensor, etc.) 973 may be connected as either internal and/or external peripheral devices 912 via the interface bus I/O 908 (not pictured) and/or directly via the interface bus 907. In turn, the transceivers may be connected to antenna(s) 975, thereby effectuating wireless transmission and reception of various communication and/or sensor protocols; for example the antenna(s) may connect to various transceiver chipsets (depending on deployment needs), including: Broadcom BCM4329FKUBG transceiver chip (e.g., providing 802.11n, Bluetooth 2.1+EDR, FM, etc.); a Broadcom BCM4752 GPS receiver with accelerometer, altimeter, GPS, gyroscope, magnetometer; a Broadcom BCM4335 transceiver chip (e.g., providing 2G, 3G, and 4G long-term evolution (LTE) cellular communications; 802.11 ac, Bluetooth 4.0 low energy (LE) (e.g., beacon features)); a Broadcom BCM43341 transceiver chip (e.g., providing 2G, 3G and 4G LTE cellular communications; 802.11 g/, Bluetooth 4.0, near field communication (NFC), FM radio); an Infineon Technologies X-Gold 618-PMB9800 transceiver chip (e.g., providing 2G/3G HSDPA/HSUPA communications); a MediaTek MT6620 transceiver chip (e.g., providing 802.11a/ac/b/g/n, Bluetooth 4.0 LE, FM, GPS; a Lapis Semiconductor ML8511 UV sensor; a maxim integrated MAX44000 ambient light and infrared proximity sensor; a Texas Instruments WiLink WL1283 transceiver chip (e.g., providing 802.11n, Bluetooth 3.0, FM, GPS); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large supercomputer(s) and mainframe(s) computers, down to mini computers, servers, desktop computers, laptops, thin clients (e.g., Chromebooks), netbooks, tablets (e.g., Android, iPads, and Windows tablets, etc.), mobile smartphones (e.g., Android, iPhones, Nokia, Palm and Windows phones, etc.), wearable device(s) (e.g., watches, glasses, goggles (e.g., Google Glass), etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 929 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; Apple's A series of processors (e.g., A5, A6, A7, A8, etc.); ARM's application, embedded and secure processors; IBM and/or Motorola's DragonBall and PowerPC; IBM's and Sony's Cell processor; Intel's 80X86 series (e.g., 80386, 80486), Pentium, Celeron, Core (2) Duo, i series (e.g., i3, i5, i7, etc.), Itanium, Xeon, and/or XScale; Motorola's 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the DPST controller and beyond through various interfaces. Should processing requirements dictate a greater amount speed and/or capacity, distributed processors (e.g., see Distributed DPST below), mainframe, multi-core, parallel, and/or super-computer architectures may similarly be employed. Alternatively, should deployment requirements dictate greater portability, smaller mobile devices (e.g., Personal Digital Assistants (PDAs)) may be employed.

Depending on the particular implementation, features of the DPST may be achieved by implementing a microcontroller such as CAST's R8051XC2 microcontroller; Intel's MCS 51 (i.e., 8051 microcontroller); and/or the like. Also, to implement certain features of the DPST, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the DPST component collection (distributed or otherwise) and/or features may be implemented via the microprocessor and/or via embedded components; e.g., via ASIC, coprocessor, DSP, FPGA, and/or the like. Alternately, some implementations of the DPST may be implemented with embedded components that are configured and used to achieve a variety of features or signal processing.

Depending on the particular implementation, the embedded components may include software solutions, hardware solutions, and/or some combination of both hardware/software solutions. For example, DPST features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the DPST features. A hierarchy of programmable interconnects allow logic blocks to be interconnected as needed by the DPST system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the DPST may be developed on regular FPGAs and then migrated into a fixed version that more resembles ASIC implementations. Alternate or coordinating implementations may migrate DPST controller features to a final ASIC instead of or in addition to FPGAs. Depending on the implementation all of the aforementioned embedded components and microprocessors may be considered the "CPU" and/or "processor" for the DPST.

Power Source

The power source 986 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 986 is connected to at least one of the interconnected subsequent components of the DPST thereby providing an electric current to all subsequent components. In one example, the power source 986 is connected to the system bus component 904. In an alternative embodiment, an outside power source 986 is provided through a connection across the I/O 908 interface. For example, a USB and/or IEEE 1394 connection carries both data and power across the connection and is therefore a suitable source of power.

Interface Adapters

Interface bus(ses) 907 may accept, connect, and/or communicate to a number of interface adapters, conventionally although not necessarily in the form of adapter cards, such as but not limited to: input output interfaces (I/O) 908, storage interfaces 909, network interfaces 910, and/or the like. Optionally, cryptographic processor interfaces 927 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 909 may accept, communicate, and/or connect to a number of storage devices such as, but not limited to: storage devices 914, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 910 may accept, communicate, and/or connect to a communications network 913. Through a communications network 913, the DPST controller is accessible through remote clients 933b (e.g., computers with web browsers) by users 933a. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., see Distributed DPST below), architectures may similarly be employed to pool, load balance, and/or otherwise decrease/increase the communicative bandwidth required by the DPST controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 910 may be used to engage with various communications network types 913. For example, multiple network interfaces may be employed to allow for the communication over broadcast, multicast, and/or unicast networks.

Input Output interfaces (I/O) 908 may accept, communicate, and/or connect to user, peripheral devices 912 (e.g., input devices 911), cryptographic processor devices 928, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

Peripheral devices 912 may be connected and/or communicate to I/O and/or other facilities of the like such as network interfaces, storage interfaces, directly to the interface bus, system bus, the CPU, and/or the like. Peripheral devices may be external, internal and/or part of the DPST controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 911 often are a type of peripheral device 512 (see above) and may include: card readers, dongles, finger print readers, gloves, graphics tablets, joysticks, keyboards, microphones, mouse (mice), remote controls, security/biometric devices (e.g., fingerprint reader, iris reader, retina reader, etc.), touch screens (e.g., capacitive, resistive, etc.), trackballs, trackpads, styluses, and/or the like.

It should be noted that although user input devices and peripheral devices may be employed, the DPST controller may be embodied as an embedded, dedicated, and/or monitor-less (i.e., headless) device, wherein access would be provided over a network interface connection.

Cryptographic units such as, but not limited to, microcontrollers, processors 926, interfaces 927, and/or devices 928 may be attached, and/or communicate with the DPST controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 929. However, memory is a fungible technology and resource, thus, any number of memory embodiments may be employed in lieu of or in concert with one another. It is to be understood that the DPST controller and/or a computer systemization may employ various forms of memory 929. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 929 will include ROM 906, RAM 905, and a storage device 914. A storage device 914 may be any conventional computer system storage. Storage devices may include: an array of devices (e.g., Redundant Array of Independent Disks (RAID)); a drum; a (fixed and/or removable) magnetic disk drive; a magneto-optical drive; an optical drive (i.e., Blu-eray, CD ROM/RAM/Recordable (R)/ReWritable (RW), DVD R/RW, HD DVD R/RW etc.); RAM drives; solid state memory devices (USB memory, solid state drives (SSD), etc.); other processor-readable storage mediums; and/or other devices of the like. Thus, a computer systemization generally requires and makes use of memory.

Component Collection

The memory 929 may contain a collection of program and/or database components and/or data such as, but not limited to: operating system component(s) 915 (operating system); information server component(s) 916 (information server); user interface component(s) 917 (user interface); Web browser component(s) 918 (Web browser); database(s) 919; mail server component(s) 921; mail client component(s) 922; cryptographic server component(s) 920 (cryptographic server); the DPST component(s) 935; and/or the like (i.e., collectively a component collection). These components may be stored and accessed from the storage devices and/or from storage devices accessible through an interface bus. Although non-conventional program components such as those in the component collection, typically, are stored in a local storage device 914, they may also be loaded and/or stored in memory such as: peripheral devices, RAM, remote storage facilities through a communications network, ROM, various forms of memory, and/or the like.

Operating System

The operating system component 915 is an executable program component facilitating the operation of the DPST controller. Typically, the operating system facilitates access of I/O, network interfaces, peripheral devices, storage devices, and/or the like. The operating system may be a highly fault tolerant, scalable, and secure system such as: Apple's Macintosh OS X (Server); AT&T Plan 9; Be OS; Google's Chrome; Microsoft's Windows 7/8; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/Mobile/NT/Vista/XP (Server), Palm OS, and/or the like. Additionally, for robust mobile deployment applications, mobile operating systems may be used, such as: Apple's iOS; China Operating System COS; Google's Android; Microsoft Windows RT/Phone; Palm's WebOS; Samsung/Intel's Tizen; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the DPST controller to communicate with other entities through a communications network 913. Various communication protocols may be used by the DPST controller as a subcarrier transport mechanism for interaction, such as, but not limited to: multicast, TCP/IP, UDP, unicast, and/or the like.

Information Server

An information server component 916 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the DPST controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the DPST database 919, operating systems, other program components, user interfaces, Web browsers, and/or the like.

Access to the DPST database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the DPST. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the DPST as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple's iOS, Macintosh Operating System's Aqua; IBM's OS/2; Google's Chrome (e.g., and other webbrowser/cloud based client OSs); Microsoft's Windows varied UIs 2000/2003/3.1/95/98/CE/Millenium/Mobile/NT/Vista/XP (Server) (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 917 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 918 is a stored program component that is executed by a CPU. The Web browser may be a conventional hypertext viewing application such as Apple's (mobile) Safari, Google's Chrome, Microsoft Internet Explorer, Mozilla's Firefox, Netscape Navigator, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the DPST enabled nodes. The combined application may be nugatory on systems employing standard Web browsers.

Mail Server

A mail server component 921 is a stored program component that is executed by a CPU 903. The mail server may be a conventional Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the DPST. Alternatively, the mail server component may be distributed out to mail service providing entities such as Google's cloud services (e.g., Gmail and notifications may alternatively be provided via messenger services such as AOL's Instant Messenger, Apple's iMessage, Google Messenger, SnapChat, etc.).

Access to the DPST mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 922 is a stored program component that is executed by a CPU 903. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 920 is a stored program component that is executed by a CPU 903, cryptographic processor 926, cryptographic processor interface 927, cryptographic processor device 928, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the DPST may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the DPST component to engage in secure transactions if so desired. The cryptographic component facilitates the secure accessing of resources on the DPST and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The DPST Database

The DPST database component 919 may be embodied in a database and its stored data. The database is a stored program component, which is executed by the CPU; the stored program component portion configuring the CPU to process the stored data. The database may be a conventional, fault tolerant, relational, scalable, secure database such as MySQL, Oracle, Sybase, etc. may be used. Additionally, optimized fast memory and distributed databases such as IBM's Netezza, MongoDB's MongoDB, opensource Hadoop, opensource VoltDB, SAP's Hana, etc. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the DPST database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the DPST database is implemented as a data-structure, the use of the DPST database 919 may be integrated into another component such as the DPST component 935. Also, the database may be implemented as a mix of data structures, objects, and relational structures. Databases may be consolidated and/or distributed in countless variations (e.g., see Distributed DPST below). Portions of databases, e.g., tables, may be exported and/or imported and thus decentralized and/or integrated.

In one embodiment, the database component 919 includes several tables 919*a-z:*

An accounts table 919*a* includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountNumber, routingNumber, linkWalletsID, accountPrioritAccaountRatio, accountAddress, accountState, accountZIPcode, accountCountry, accountEmail, accountPhone, accountAuthKey, accountIPaddress, accountURLAccessCode, accountPortNo, accountAuthorizationCode, accountAccessPrivileges, accountPreferences, accountRestrictions, and/or the like;

A users table 919*b* includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, userAuthorizationCode, userAccessPrivilges, userPreferences, userRestrictions, and/or the like (the user table may support and/or track multiple entity accounts on a DPST);

An devices table 919*c* includes fields such as, but not limited to: deviceID, sensorIDs, accountID, assetIDs, paymentIDs, deviceType, deviceName, deviceManufacturer, deviceModel, deviceVersion, deviceSerialNo, deviceIPaddress, deviceMACaddress, device_ECID, deviceUUID, deviceLocation, deviceCertificate, deviceOS, appIDs, deviceResources, deviceSession, authKey, deviceSecureKey, walletAppinstalledFlag, deviceAccessPrivileges, devicePreferences, deviceRestrictions, hardware_config, software_config, storagelocation, sensor_value, pin_reading, data_length, channel_requirement, sensor_name, sensor_model_no, sensor_manufacturer, sensor_type, sensor_serial_number, sensor_power_requirement, device_power_requirement, location, sensor_associated_tool, sensor_dimensions, device_dimensions, sensor_communications_type, device_communications_type, power_percentage, power_condition, temperature_setting, speed_adjust, hold_duration, part_actuation, and/or the like. Device table may, in some embodiments, include fields corresponding to one or more Bluetooth profiles, such as those published at https://www.bluetooth.org/en-us/specification/adopted-specifications, and/or other device specifications, and/or the like;

An apps table 919*d* includes fields such as, but not limited to: appID, appName, appType, appDependencies, accountID, deviceIDs, transactionID, userID, appStoreAuthKey, appStoreAccountID, appStoreIPaddress, appStoreURLaccessCode, appStorePortNo, appAccessPrivileges, appPreferences, appRestrictions, portNum, access_API_call, linked_wallets_list, and/or the like;

An assets table 919*e* includes fields such as, but not limited to: assetID, accountID, userID, distributorAccountID, distributorPaymentID, distributorOnwerID, assetType, assetName, assetCode, assetQuantity, assetCost, assetPrice, assetManufactuer, assetModelNo, assetSerialNo, assetLocation, assetAddress, assetState, assetZIPcode, assetState, assetCountry, assetEmail, assetIPaddress, assetURLaccessCode, assetOwnerAccountID, subscriptionIDs, assetAuthroizationCode, assetAccessPrivileges, assetPreferences, assetRestrictions, and/or the like;

A payments table 919*f* includes fields such as, but not limited to: paymentID, accountID, userID, paymentType, paymentAccountNo, paymentAccountName, paymentAccountAuthorizationCodes, paymentExpirationDate, paymentCCV, paymentRoutingNo, paymentRoutingType, paymentAddress, paymentState, paymentZIPcode, paymentCountry, paymentEmail, paymentAuthKey, paymentIPaddress, paymentURLaccessCode, paymentPortNo, paymentAccessPrivileges, paymentPreferences, payementRestrictions, and/or the like;

An transactions table 919g includes fields such as, but not limited to: transactionID, accountID, assetIDs, deviceIDs, paymentIDs, transactionIDs, userID, merchantID, transactionType, transactionDate, transactionTime, transactionAmount, transactionQuantity, transactionDetails, productsList, productType, productTitle, productsSummary, productParamsList, transactionNo, transactionAccessPrivileges, transactionPreferences, transactionRestrictions, merchantAuthKey, merchantAuthCode, and/or the like;

An index table 919h includes fields such as, but not limited to: indexID, dataProviderID, dataProviderName, indexType, indexPercentile, indexDetail, indexCorrelation, indexValue, indexName, indexTimestamp, assetID, portfolioID, weightsID, macroID, accountID, and/or the like;

An data_provider table 919i includes fields such as, but not limited to: dataProviderID, dataProviderName, dataProviderType, providerDataType, providerServerIP, providerServerID, providerURL, indexID, assetID, portfolioID, weightsID, macroID, accountID, and/or the like;

An target table 919j includes fields such as, but not limited to: targetID, portfolioID, userID, accountID, assetID, portfolioName, targetName, target return, targetYield, targetDuration, targetVolatility, and/or the like;

An portfolio table 919k includes fields such as, but not limited to: portfolioID, portfolioName, userID, accountID, assetID, transactionID, marketID, dataProviderID, portfolioStartDate, portfolioEndDate, portfolioAssumption, portfolioTarget, portfolioConstraints, portfolioAllocationWeights, weightsID, portfolioActualReturn, and/or the like;

An performance table 919l includes fields such as, but not limited to: performanceID, performanceType, performanceMetricName, userID, accountID, transactionID, portfolioID, weightsID, portfolioAllocationWeights, portfolioYield, portfolioReturn, and/or the like;

An weights table 919m includes fields such as, but not limited to: weightsID, portfolioID, indexID, targetID, dataProviderID, userID, accountID, USTreasuryWeight, USCorpIgWeight, USHighYield, emBondsWeight, globalAggWeight, and/or the like;

An graphs table 919l includes fields such as, but not limited to: graphID, userID, accountID, portfolioID, portfolioWeights, portfolioReturns, portfolioYield, templateID, templateName, chartType, chartName, targetID, transactionID, marketDataFeedID, indexID, and/or the like;

A market_data table 919z includes fields such as, but not limited to: market_data_feed_ID, asset_ID, asset_symbol, asset_name, spot_price, bid_price, ask_price, and/or the like; in one embodiment, the market data table is populated through a market data feed (e.g., Bloomberg's PhatPipe, Dun & Bradstreet, Reuter's Tib, Triarch, etc.), for example, through Microsoft's Active Template Library and Dealing Object Technology's real-time toolkit Rtt.Multi.

In one embodiment, the DPST database may interact with other database systems. For example, employing a distributed database system, queries and data access by search DPST component may treat the combination of the DPST database, an integrated data security layer database as a single database entity (e.g., see Distributed DPST below).

In one embodiment, user programs may contain various user interface primitives, which may serve to update the DPST. Also, various accounts may require custom database tables depending upon the environments and the types of clients the DPST may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 919a-z. The DPST may be configured to keep track of various settings, inputs, and parameters via database controllers.

The DPST database may communicate to and/or with other components in a component collection, including itself, and/or facilities of the like. Most frequently, the DPST database communicates with the DPST component, other program components, and/or the like. The database may contain, retain, and provide information regarding other nodes and data.

The DPSTs

The DPST component 935 is a stored program component that is executed by a CPU. In one embodiment, the DPST component incorporates any and/or all combinations of the aspects of the DPST that was discussed in the previous figures. As such, the DPST affects accessing, obtaining and the provision of information, services, transactions, and/or the like across various communications networks. The features and embodiments of the DPST discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the DPST's features and facilities, and in many cases reduce the costs, energy consumption/requirements, and extend the life of DPST's underlying infrastructure; this has the added benefit of making the DPST more reliable. Similarly, many of the features and mechanisms are designed to be easier for users to use and access, thereby broadening the audience that may enjoy/employ and exploit the feature sets of the DPST; such ease of use also helps to increase the reliability of the DPST. In addition, the feature sets include heightened security as noted via the Cryptographic components 920, 926, 928 and throughout, making access to the features and data more reliable and secure The DPST transforms market assumptions 305, constraints inputs (e.g. 204, 503d and FIGS. 4A-7D), via DPST components/component collection 304, 935 (e.g., index data collector 942, index processing 943, portfolio composite calculator 944, widget customization 945, dynamic portfolio simulation 946, dynamic user interface 947), into asset allocation record 212, portfolio allocation and graphic presentation outputs 211.

The DPST component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the DPST server employs a cryptographic server to encrypt and decrypt communications. The DPST component may communicate to and/or with other components in a component collection, including itself, and/or facilities of the like. Most frequently, the DPST component communicates with the DPST database, operating systems, other program components, and/or the like. The DPST may contain, communicate, generate, obtain, and/or provide program component, system, user, and/or data communications, requests, and/or responses.

Distributed DPSTs

The structure and/or operation of any of the DPST node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such a combination of hardware may be distributed within a location, within a region and/or globally where logical access to a controller may be abstracted as a singular node, yet where a multitude of private, semiprivate and publically accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access).

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the DPST controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like. For example, cloud services such as Amazon Data Services, Microsoft Azure, Hewlett Packard Helion, IBM Cloud services allow for DPST controller and/or DPST component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the DPST controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of
message do {
    $input = "";
    $input = socket_read($client, 1024);
    $data .= $input;
} while($input != "");
// parse data to extract variables
$obj = json_decode($data, true);
// store input data in a database
mysql_connect("201.408.185.132",$DBserver,$password); // access
database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

In order to address various issues and advance the art, the entirety of this application for Dynamic Portfolio Simulator Tool Apparatuses, Methods and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower," "upper," "horizontal," "vertical," "above," "below," "up," "down," "top" and "bottom" as well as derivative thereof (e.g., "horizontally," "downwardly," "upwardly," etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached," "affixed," "connected," "coupled," "interconnected," and similar may refer to a relationship wherein structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a DPST individual and/or enterprise user, database configuration and/or relational model, data type, data transmission and/or network framework, syntax structure, and/or the like, various embodiments of the DPST, may be implemented that enable a great deal of flexibility and customization. For example, aspects of the DPST may be adapted for operation management. While various embodiments and discussions of the DPST have included asset information technology, however, it is to be understood that the embodiments described herein may be readily configured and/or customized for a wide variety of other applications and/or implementations.

What is claimed is:

1. A dynamic range slider user interface stored in a non-transient processor-readable medium storing processor-executable instructions issuable by a processor to:

generate a slider bar having a default slider color with a slider length;
generate a slider value selector knob traversable across the length of the slider bar, wherein the slider value selector knob is selectable and movable by a user;
obtain user collection parameter constraints;
calculate hard minimum and maximum values for a selected collection;
calculate, via a dynamic simulator tool component collection, a soft dynamic minimum and maximum values for a selected collection based on the user collection parameter constraints;
provide, to a dynamic user interface component, the calculated hard minimum and maximum values for the selected collection and the soft dynamic minimum and maximum values for the selected collection;
update the slider bar with a highlight denoting the calculated soft dynamic minimum and maximum value range for the selected collection;
update the slider bar with updated values for the hard minimum and maximum values for the selected collection;
update positioning of the slider value selector knob within the soft dynamic minimum and maximum range;
generate and provide a dynamic range slider bar compositing the updated slider bar and slider value selector knob for interaction.

2. The apparatus of claim 1, wherein the collection may include any of: an asset collection, a portfolio, search results.

3. The apparatus of claim 1, wherein the collection parameter constraints may include any of:
product characteristics and traits, financial asset characteristics and traits.

4. The apparatus of claim 3, wherein the characteristics and traits may include any of: cost, price, sale price, ask price, bid price, product feature specification parameters.

5. The dynamic range slider user interface of claim 1 wherein filtering criteria comprises soft minimum and maximum values bounding a range on the slider, and wherein that range is visually highlighted on the slider.

6. The dynamic range slider user interface of claim 5 wherein the range is highlighted in a different color.

7. The dynamic range slider user interface of claim 6 wherein the filtering is calculated based on a user's portfolio optimized holdings.

8. The dynamic range slider user interface of claim 7 wherein the filtering is based on user input parameters including any of yield, return, duration, volatility and correlation.

9. The dynamic range slider user interface of claim 8 wherein the filtering criteria include product attributes.

* * * * *